US00RE49703E

(19) United States
(12) Reissued Patent
Chen et al.

(10) Patent Number: US RE49,703 E
(45) Date of Reissued Patent: Oct. 17, 2023

(54) COMPACT OPTICAL SYSTEM, IMAGE CAPTURING UNIT AND ELECTRONIC DEVICE

(71) Applicant: LARGAN PRECISION CO., LTD., Taichung (TW)

(72) Inventors: Kuan-Ming Chen, Taichung (TW); Hsin-Hsuan Huang, Taichung (TW)

(73) Assignee: LARGAN PRECISION CO., LTD., Taichung (TW)

(21) Appl. No.: 17/497,867

(22) Filed: Oct. 8, 2021

Related U.S. Patent Documents

Reissue of:
(64) Patent No.: 9,885,856
Issued: Feb. 6, 2018
Appl. No.: 14/699,848
Filed: Apr. 29, 2015

U.S. Applications:
(63) Continuation of application No. 16/709,871, filed on Dec. 10, 2019, now Pat. No. Re. 48,828, which is an application for the reissue of Pat. No. 9,885,856.

(30) Foreign Application Priority Data

Jan. 9, 2015 (TW) ..... 104100808

(51) Int. Cl.
*G02B 13/00* (2006.01)
*G02B 9/12* (2006.01)
(Continued)

(52) U.S. Cl.
CPC ..... *G02B 13/0035* (2013.01); *G02B 3/04* (2013.01); *G02B 9/12* (2013.01); *G02B 13/18* (2013.01)

(58) Field of Classification Search
CPC ..... G02B 13/0035; G02B 9/12; G02B 13/18; G02B 3/04
See application file for complete search history.

(56) References Cited

U.S. PATENT DOCUMENTS 3,877,792 A 4/1975 Cox et al.
3,936,154 A 2/1976 Fleischmann
(Continued)

FOREIGN PATENT DOCUMENTS

CN 102608730 A 7/2012
CN 203630432 U 6/2014
(Continued)

OTHER PUBLICATIONS

"Focal power." (1992) In C. G. Morris (Ed.), Academic Press Dictionary of Science and Technology, 4th ed., Oxford, UK: Elsevier Science & Technology. (Year 1992).
(Continued)

*Primary Examiner* — Christina Y. Leung
(74) *Attorney, Agent, or Firm* — Maschoff Brennan

(57) ABSTRACT

A compact optical system includes, in order from an object side to an image side, a first lens element, a second lens element and a third lens element. The first lens element with negative refractive power has an image-side surface being concave in a paraxial region thereof. The second lens element has refractive power, wherein at least one of two surfaces of the second lens element is aspheric, and the second lens element is made of plastic material. The third lens element has positive refractive power, wherein at least one of two surfaces of the third lens element is aspheric, and the third lens element is made of plastic material. The compact optical system further comprises a stop located between the first lens element and the second lens element. The first, second, and third lens elements are all stationary relative to one another in a paraxial region.

25 Claims, 32 Drawing Sheets

(51) Int. Cl.

| | |
|---|---|
| ***G02B 9/16*** | (2006.01) |
| ***G02B 13/18*** | (2006.01) |
| ***G02B 3/04*** | (2006.01) |

(56) References Cited

U.S. PATENT DOCUMENTS

| | | | | |
|---|---|---|---|---|
| 4,009,928 | A | 3/1977 | Back | |
| 5,418,649 | A | 5/1995 | Igarashi | |
| 5,502,592 | A | 3/1996 | Jamieson | |
| 5,745,301 | A | 4/1998 | Betensky et al. | |
| 5,828,498 | A | 10/1998 | Sekiya et al. | |
| 8,189,276 | B1 | 5/2012 | Hsu et al. | |
| 8,451,547 | B2 * | 5/2013 | Imaoka | G02B 9/12 359/716 |
| 8,891,142 | B2 * | 11/2014 | Nagano | G02B 9/34 358/471 |
| 2003/0076584 | A1 | 4/2003 | Nagahara | |
| 2005/0271258 | A1 * | 12/2005 | Rowe | G06V 40/1394 382/191 |
| 2006/0202038 | A1 * | 9/2006 | Wang | G06K 7/10732 235/462.24 |
| 2010/0232013 | A1 | 9/2010 | Yin et al. | |
| 2010/0290129 | A1 * | 11/2010 | Nishio | G02B 25/001 359/645 |
| 2011/0043916 | A1 | 2/2011 | Wang et al. | |
| 2013/0094099 | A1 | 4/2013 | Ko | |
| 2013/0120859 | A1 | 5/2013 | Tsai et al. | |
| 2013/0279026 | A1 | 10/2013 | Asami et al. | |
| 2014/0016212 | A1 * | 1/2014 | Kim | G02B 13/04 359/716 |
| 2014/0293456 | A1 | 10/2014 | Komiyama | |
| 2015/0248050 | A1 * | 9/2015 | Nakamura | G03B 17/565 359/675 |
| 2016/0018639 | A1 * | 1/2016 | Spitzer | G02B 5/30 345/156 |

FOREIGN PATENT DOCUMENTS

| | | | |
|---|---|---|---|
| EP | 0905646 | A1 | 3/1999 |
| JP | S57192915 | A | 11/1982 |
| JP | S58140713 | A | 8/1983 |
| JP | S6091317 | A | 5/1985 |
| JP | S63-06713 | A | 5/1988 |
| JP | H02-208617 | A | 8/1990 |
| JP | H02208617 | A | 8/1990 |
| JP | H05125964 | A | 8/1993 |
| JP | 06082690 | | 3/1994 |
| JP | H0682690 | A | 3/1994 |
| JP | H08122634 | A | 5/1996 |
| JP | H08220429 | A | 8/1996 |
| JP | H08220430 | A | 8/1996 |
| JP | H09197264 | A | 7/1997 |
| JP | H10288736 | A | 10/1998 |
| JP | H10301023 | A | 11/1998 |
| JP | 1998-319315 | A | 12/1998 |
| JP | H10319315 | A | 12/1998 |
| JP | H11271607 | A | 10/1999 |
| JP | 2000-066097 | A | 3/2000 |
| JP | 2006162829 | A | 6/2006 |
| JP | 2007078800 | A | 3/2007 |
| JP | 2007279547 | A | 10/2007 |
| JP | 2007279548 | A | 10/2007 |
| JP | 2008164989 | | 7/2008 |
| JP | 2008180887 | A | 8/2008 |
| JP | 2009156950 | A | 7/2009 |
| JP | 2009297401 | A | 12/2009 |
| JP | 2014209190 | A | 11/2014 |
| JP | 2016031501 | A | 3/2016 |
| JP | 2016-170446 | A | 9/2016 |
| JP | 2016-218471 | A | 12/2016 |
| TW | M426829 | U | 4/2012 |
| WO | 9852076 | A1 | 11/1998 |
| WO | 2012-066750 | A1 | 8/2010 |

OTHER PUBLICATIONS

"F-number." (1992) In C. G. Morris (Ed.), Academic Press Dictionary of Science and Technology, 4th ed., Oxford, UK: Elsevier Science & Technology. (Year 1992).

Intellectual Property Office, Ministry of Economic Affairs, R. O. C, "Office Action", dated Oct. 13, 2015, Taiwan.

* cited by examiner

COMPACT OPTICAL SYSTEM, IMAGE CAPTURING UNIT AND ELECTRONIC DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

*This application is a continuation reissue of application Ser. No. 16/709,871, which is an application for reissue of U.S. Pat. No. 9,885,856 B2, now RE48,828 E.*

This application claims priority to Taiwan Application 104100808, filed Jan. 9, 2015, which is incorporated by reference herein in its entirety.

BACKGROUND

Technical Field

The present disclosure relates to a compact optical system, an image capturing unit and an electronic device, more particularly to a compact optical system and an image capturing unit applicable to an electronic device.

Description of Related Art

A conventional biometric system equipped in a mobile device generally utilizes a capacitive sensor. Although the capacitive sensor is favorable for miniaturizing the biometric system, complex electronic circuits in the capacitive sensor are unfavorable for reducing the manufacturing cost. Therefore, the mobile device with the capacitive biometric system requires a higher production cost which makes it difficult to gain popularity.

Other biometric systems with conventional optical system are developed, such as fingerprint recognition systems and vein recognition systems. However, the larger volume of the conventional optical system is unfavorable for miniaturizing an electronic device having the biometric system and keeping the electronic device compact, and therefore the portability of the electronic device is reduced. Thus, there is a need for a compact optical system of low costs and good manufacturing yield rate, which can be favorably applied to biometric applications.

SUMMARY

According to one aspect of the present disclosure, a compact optical system includes, in order from an object side to an image side, a first lens element, a second lens element and a third lens element. The first lens element with negative refractive power has an image-side surface being concave in a paraxial region thereof. The second lens element has refractive power, wherein at least one of an object-side surface and an image-side surface of the second lens element is aspheric, and the second lens element is made of plastic material. The third lens element has positive refractive power, wherein at least one of an object-side surface and an image-side surface of the third lens element is aspheric, and the third lens element is made of plastic material. The compact optical system has a total of three lens elements with refractive power. The compact optical system further comprises a stop located between the first lens element and the second lens element. The first lens element, the second lens element and the third lens element are all stationary relative to one another in a paraxial region thereof. When a focal length of the compact optical system is f, a maximum image height of the compact optical system is ImgH, a refractive index of the first lens element is N1, a refractive index of the second lens element is N2, a refractive index of the third lens element is N3, an axial distance between the stop and the object-side surface of the second lens element is Dsr3, an axial distance between the stop and the object-side surface of the third lens element is Dsr5, the following conditions are satisfied:

$$f/ImgH<0.55;$$

$$4.70<N1+N2+N3<5.50; \text{ and}$$

$$0<|Dsr3/Dsr5|<0.50.$$

According to another aspect of the present disclosure, an image capturing unit includes an image sensor and the aforementioned compact optical system, wherein the image sensor is disposed on the image side of the compact optical system.

According to still another aspect of the present disclosure, an electronic device includes a biometric system, and the biometric system includes the aforementioned image capturing unit.

According to yet another aspect of the present disclosure, a compact optical system includes, in order from an object side to an image side, a first lens element, a second lens element and a third lens element. The first lens element with negative refractive power has an image-side surface being concave in a paraxial region thereof. The second lens element has refractive power, wherein at least one of an object-side surface and an image-side surface of the second lens element is aspheric, and the second lens element is made of plastic material. The third lens element has positive refractive power, wherein at least one of an object-side surface and an image-side surface of the third lens element is aspheric, and the third lens element is made of plastic material. The compact optical system has a total of three lens elements with refractive power. The compact optical system further comprises a stop located between the first lens element and the second lens element. The first lens element, the second lens element and the third lens element are all stationary relative to one another in a paraxial region thereof. When a focal length of the compact optical system is f, a maximum image height of the compact optical system is ImgH, a refractive index of the first lens element is N1, a refractive index of the second lens element is N2, a refractive index of the third lens element is N3, an axial distance between the stop and the object-side surface of the second lens element is Dsr3, an axial distance between the stop and the object-side surface of the third lens element is Dsr5, an axial distance between an imaged object and an image surface is OTL, a sum of central thicknesses of the first lens element, the second lens element and the third lens element is ΣCT, the following conditions are satisfied:

$$f/ImgH<0.70;$$

$$4.70<N1+N2+N3<5.50;$$

$$0<|Dsr3/Dsr5|<0.50; \text{ and}$$

$$OTL/\Sigma CT<4.0.$$

According to yet still another aspect of the present disclosure, an image capturing unit includes a light source, an image sensor and the aforementioned compact optical system, wherein the image sensor is disposed on the image side of the compact optical system.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
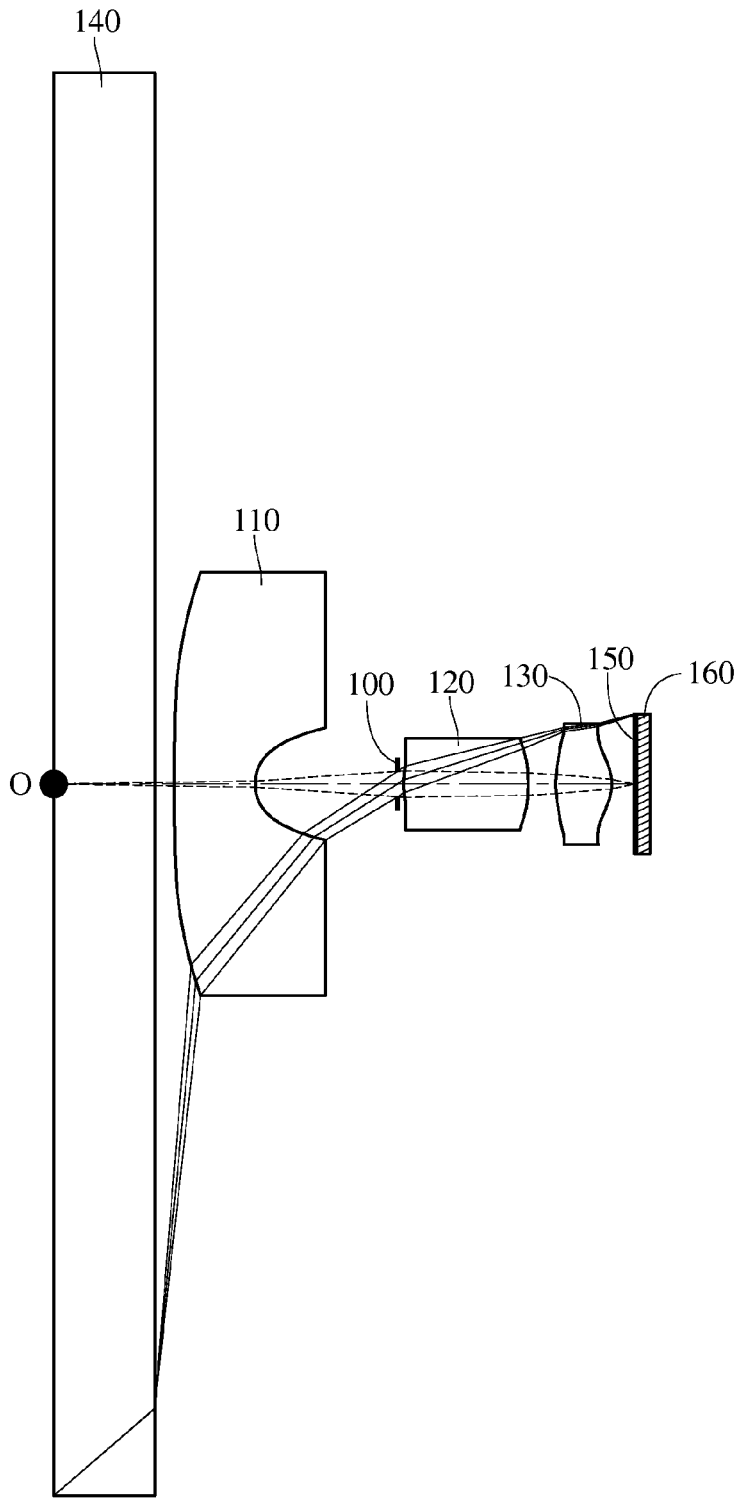
FIG. 1A is a schematic view of an image capturing unit according to the 1st embodiment of the present disclosure.

A compact optical system includes, in order from an object side to an image side, a first lens element, a second lens element and a third lens element. The compact optical system has a total of three lens elements with refractive power. The first lens element, the second lens element and the third lens element can all be stationary relative to one another in a paraxial region thereof. For example, in some embodiments, an air gap in a paraxial region is located between every two of the first lens element, the second lens element and the third lens element that are adjacent to each other, and the air gaps are all constant.

The first lens element with negative refractive power has an image-side surface being concave in a paraxial region thereof. Therefore, it is favorable for enlarging the field of view of the compact optical system so as to provide a wider field of view for the same.

The second lens element can have positive refractive power. The second lens element can have an image-side surface being convex in a paraxial region thereof. Therefore, the second lens element is favorable for correcting the aberration from the first lens element and the spherical aberration of the compact optical system so as to improve the image quality.

The third lens element has positive refractive power. The third lens element can have an image-side surface being convex in a paraxial region thereof. At least one of an object-side surface and the image-side surface of the third lens element can have at least one inflection point. Therefore, it is favorable for providing the compact optical system with retrofocus (reversed telephoto) performance so as to reduce the chief ray angle of the compact optical system, thereby providing the compact optical system with enhanced telecentric performance.

When a focal length of the compact optical system is f, a maximum image height of the compact optical system (half of a diagonal length of an effective photosensitive area of an image sensor) is ImgH, the following condition is satisfied: $f/ImgH<0.70$. Therefore, it is favorable for collecting the light with large incident angle so as to allow the compact optical system to capture a wide field of view and recognize an imaged object while the distance between the imaged object and the compact optical system is extremely close. Preferably, the following condition is satisfied: $f/ImgH<0.55$. More preferably, the following condition is satisfied: $f/ImgH<0.45$.

When a refractive index of the first lens element is N1, a refractive index of the second lens element is N2, a refractive index of the third lens element is N3, the following condition is satisfied: $4.70<N1+N2+N3<5.50$. Therefore, it is favorable for reducing a required distance for image capturing between the imaged object and the compact optical system so as to keep the compact optical system compact.

According to the present disclosure, the compact optical system further comprises a stop located between the first lens element and the second lens element. When an axial distance between the stop and an object-side surface of the second lens element is Dsr3, an axial distance between the stop and the object-side surface of the third lens element is Dsr5, the following condition is satisfied: $0<|Dsr3/Dsr5|<0.50$. Therefore, it is favorable for properly allocating the stop so as to enlarge the field of view of the compact optical system, thereby providing a wider field of view for the same.

Figure 21:
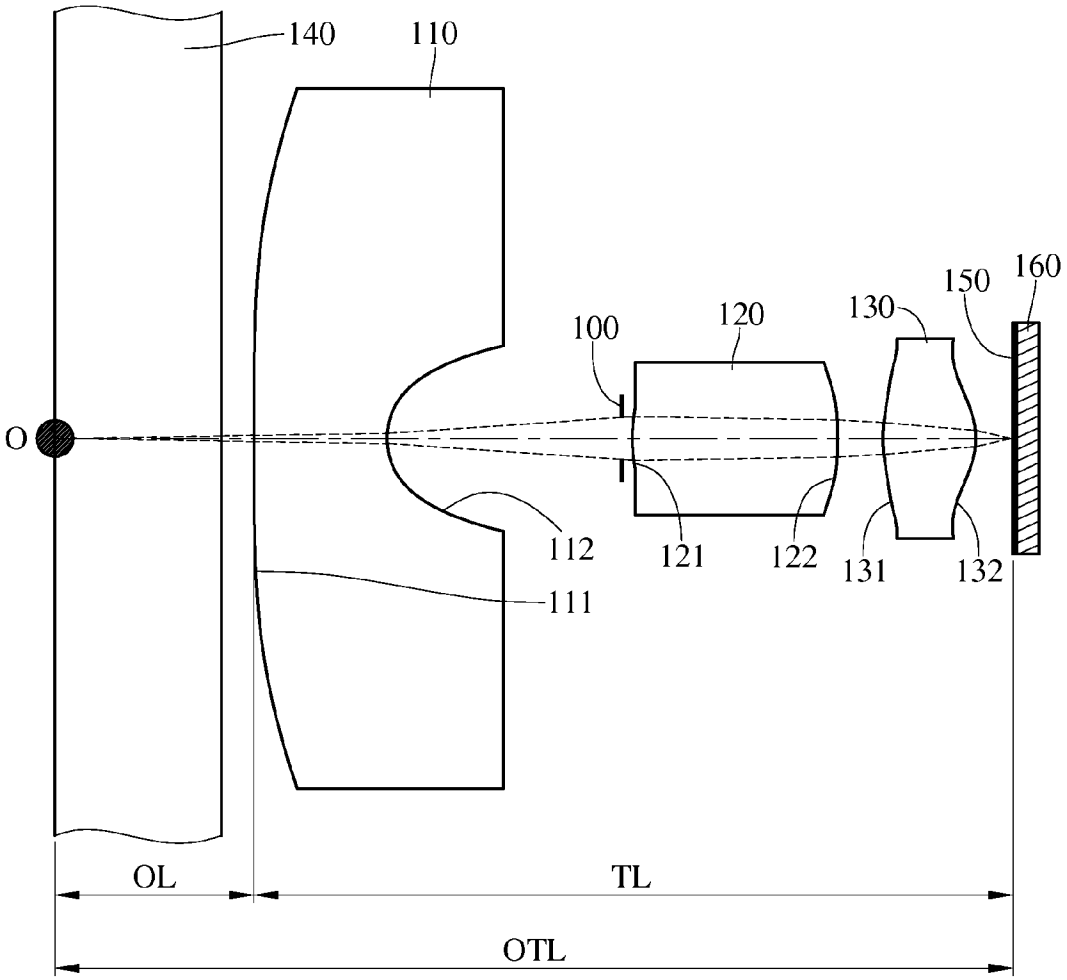
FIG. 21 is a schematic view of OL, TL and OTL in FIG. 1.

When an axial distance between the imaged object and an image surface is OTL, a sum of central thicknesses of the first lens element, the second lens element and the third lens element is ΣCT (That is, a sum of a central thickness of the first lens element, a central thickness of the second lens element and a central thickness of the third lens element), the following condition is satisfied: $OTL/\Sigma CT<4.0$. Therefore, it is favorable for further keeping the compact optical system compact. As seen in FIG. 21, it shows a schematic view of OTL in FIG. 1.

When a curvature radius of the object-side surface of the third lens element is R5, a curvature radius of the image-side surface of the third lens element is R6, the following condition can be satisfied: $(R5+R6)/(R5-R6)<0.90$. Therefore, it is favorable for avoiding excessive astigmatism and spherical aberration of the compact optical system so as to improve the image quality. Preferably, the following condition can be satisfied: $-0.50<(R5+R6)/(R5-R6)<0.50$.

When the axial distance between the imaged object and the image surface is OTL, the following condition can be satisfied: OTL<8.0 millimeters (mm). Therefore, it is favorable for keeping the compact optical system compact so as to be equipped in a compact electronic device having a biometric system. Preferably, the following condition can be satisfied: OTL<5.0 mm.

When an Abbe number of the first lens element is V1, an Abbe number of the second lens element is V2, an Abbe number of the third lens element is V3, the following condition can be satisfied: $V1+V2+V3<80$. Therefore, it is favorable for correcting the chromatic aberration of the compact optical system.

When the focal length of the compact optical system is f, an entrance pupil diameter of the compact optical system is EPD, the following condition can be satisfied: $f/EPD<2.60$. Therefore, it is favorable for obtaining a large aperture for receiving sufficient incoming light, thereby increasing the image quality in a low light condition.

When the focal length of the compact optical system is f, a focal length of the first lens element is f1, a focal length of the second lens element is f2, a focal length of the third lens element is f3, the following condition can be satisfied: $|f/f1|+|f/f2|+|f/f3|<1.1$. Therefore, it is favorable for balancing the arrangement of the compact optical system so as to effectively correct the aberration of the compact optical system and reducing the sensitivity of the compact optical system.

When the axial distance between the imaged object and the image surface is OTL, the maximum image height of the compact optical system is ImgH, the following condition can be satisfied: $OTL/ImgH<12$. Therefore, it is favorable for keeping the compact optical system compact so as to be equipped in an electronic device.

When a maximal field of view of the compact optical system is FOV, the following condition can be satisfied: 140.0 degrees (deg.)<FOV<180.0 deg. Therefore, it is favorable for providing a sufficient field of view so as to obtain more of the image scene and properly reducing the image distortion simultaneously.

According to the present disclosure, the compact optical system further comprises a flat panel located between the imaged object and an object-side surface of the first lens element. The flat panel is, for example, a glass cover or a plastic cover. When a central thickness of the flat panel is CTf, a central thickness of the first lens element is CT1, the following condition can be satisfied: $0.95<CTf/CT1<5.5$. Therefore, the thicknesses of the flat panel and the first lens element are properly distributed so that it is favorable for reducing manufacturing cost and keeping in a compact size thereof.

When an axial distance between the first lens element and the second lens element is T12, the central thickness of the first lens element is CT1, the following condition can be satisfied: $1.50<T12/CT1<10$. Therefore, it is favorable for assembling the compact optical system so as to increase the manufacturing yield rate.

When an axial distance between the imaged object and the object-side surface of the first lens element is OL, an axial distance between the object-side surface of the first lens element and the image surface is TL, the following condition can be satisfied: $0<OL/TL<1.0$. Therefore, it is favorable for reducing the required distance for image capturing between the imaged object and the compact optical system so as to keep the compact optical system compact. As seen in FIG. 21, it shows a schematic view of OL and TL in FIG. 1.

When an axial distance between the object-side surface of the first lens element and the image-side surface of the third lens element is TD, the focal length of the compact optical system is f, the following condition can be satisfied: $8<TD/f<30$. Therefore, it is favorable for tightly arranging the lens elements so as to reduce a total track length of the compact optical system.

According to the compact optical system of the present disclosure, an aperture stop can be configured as a middle stop. A middle stop disposed between the first lens element and the image surface is favorable for enlarging the field of view of the compact optical system and thereby provides a wider field of view for the same.

According to the compact optical system of the present disclosure, the lens elements thereof can be made of glass or plastic material. When the lens elements are made of glass material, the distribution of the refractive power of the compact optical system may be more flexible to design. When the lens elements are made of plastic material, the manufacturing cost can be effectively reduced. Furthermore, surfaces of each lens element can be arranged to be aspheric or spherical. The aspheric surface of the lens element is easy to form a shape other than spherical surface so as to have more controllable variables for eliminating the aberration thereof, and to further decrease the required number of the lens elements. Therefore, the total track length of the compact optical system can also be reduced.

According to the compact optical system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the compact optical system of the present disclosure, an image surface of the compact optical system, based on the corresponding image sensor, can be flat or curved, especially a curved surface being concave facing towards the object side of the compact optical system.

According to the compact optical system of the present disclosure, the compact optical system can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the compact optical system according to the aforementioned compact optical system of the present disclosure, and an image sensor, wherein the image sensor is disposed on the image side of the aforementioned compact optical system, that is, the image sensor can be disposed on or near an image surface of the aforementioned compact optical system. In some embodiments, the image capturing unit can further include a barrel member, a holding member or a combination thereof.

Figure 22:
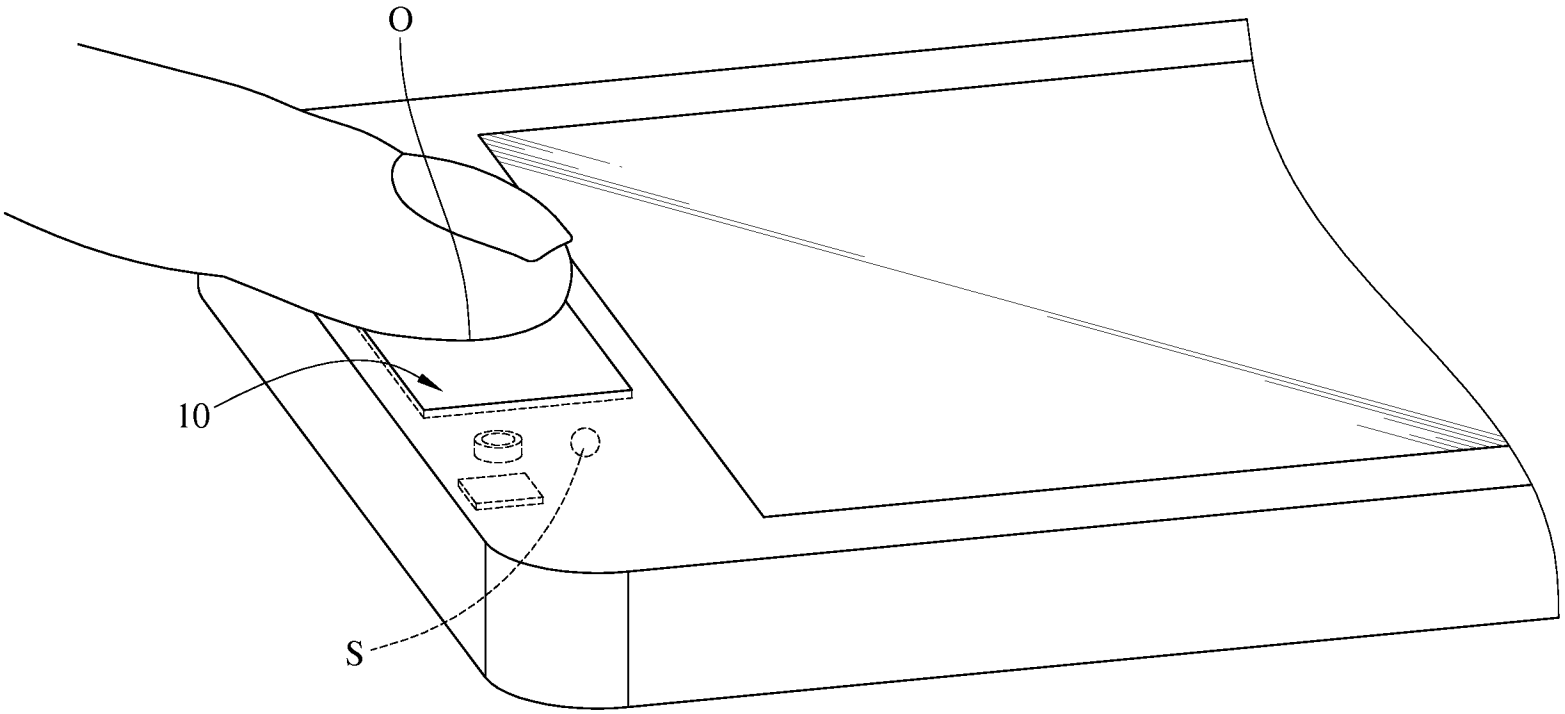
FIG. 22 shows an electronic device according to an embodiment.

In FIG. 22, an image capturing device 10 may be installed in, but not limited to, an electronic device including a biometric system, such as a fingerprint recognition device (FIG. 22) and a vein recognition device. The image capturing device 10 can comprises a light source S located at one side of the compact optical system. The figure of the electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the compact optical system of the present disclosure, the compact optical system is featured with good capability in the correction of aberration and high image quality, and can be applied to 3D (three-dimensional) image capturing applications, in products such as digital cameras, mobile devices, digital tablets, wearable devices, smart televisions and other electronic imaging devices. Furthermore, the compact optical system is favorable for being operated within a wavelength range of blue light spectrum, red light spectrum or visible light spectrum. When the compact optical system is operated within the wavelength range of blue light spectrum (400 nm~500 nm), it is favorable for miniaturizing the compact optical system. When the compact optical system is operated within the wavelength range of red light spectrum (620 nm~750 nm), it is favorable for reducing the interference with the human eyes so as to enhance the degree of comfort. According to the above description of the present disclosure, the following specific embodiments are provided for further explanation.

1st Embodiment

Figure 1B:
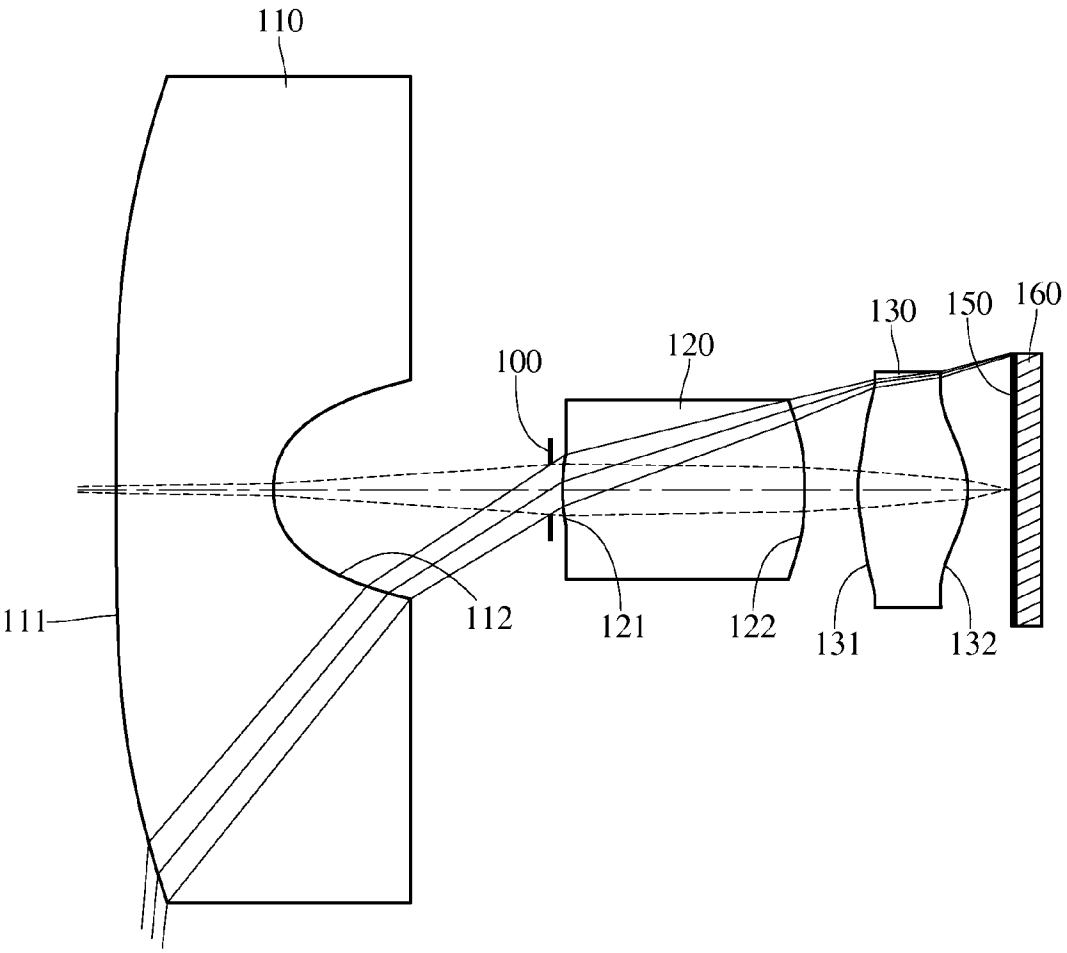
FIG. 1B is a partially enlarged schematic view of the image capturing unit in FIG. 1A.
Figure 2:
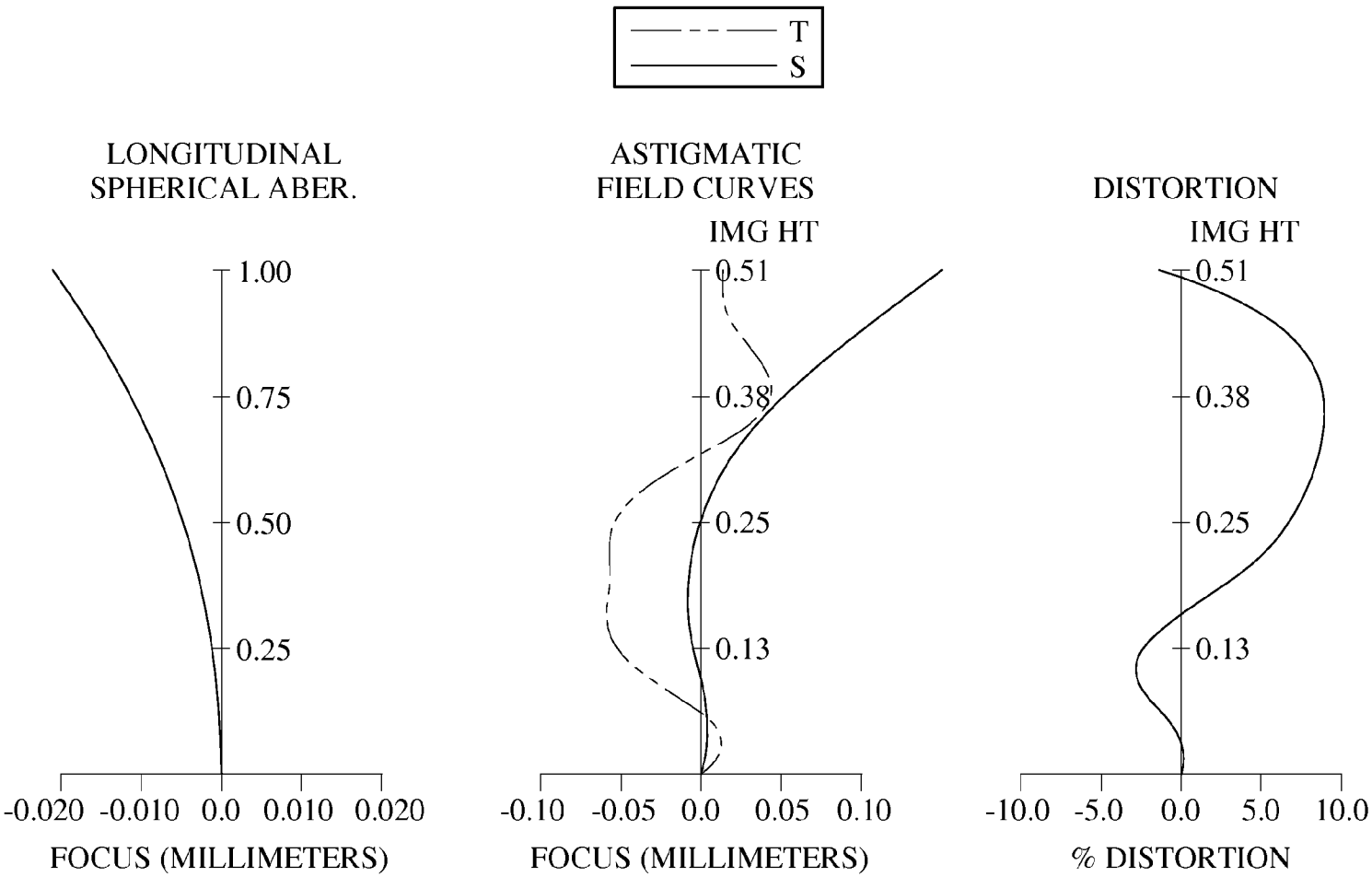
FIG. 2 shows spherical aberration curves, astigmatic field curves and a distortion curve of the image capturing unit according to the 1st embodiment.

FIG. 1A is a schematic view of an image capturing unit according to the 1st embodiment of the present disclosure. FIG. 1B is a partially enlarged schematic view of the image capturing unit in FIG. 1A. FIG. 2 shows spherical aberration curves, astigmatic field curves and a distortion curve of the image capturing unit according to the 1st embodiment. In FIG. 1A and FIG. 1B, the image capturing unit includes the compact optical system (its reference numeral is omitted) of the present disclosure and an image sensor 160. The compact optical system includes, in order from an object side to an image side, a flat panel 140, a first lens element 110, an aperture stop 100, a second lens element 120, a third lens element 130 and an image surface 150, wherein the compact optical system has a total of three lens elements (110-130) with refractive power. The first lens element 110, the second lens element 120 and the third lens element 130 are all stationary relative to one another in a paraxial region thereof.

The first lens element 110 with negative refractive power has an object-side surface 111 being convex in a paraxial region thereof and an image-side surface 112 being concave in a paraxial region thereof. The first lens element 110 is made of plastic material, and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material, and has the object-side surface 131 and the image-side surface 132 being both aspheric. The object-side surface 131 and the image-side surface 132 of the third lens element 130 have at least one inflection point.

The flat panel 140 is made of glass and located between an imaged object O and the first lens element 110, and will not affect the focal length of the compact optical system. The image sensor 160 is disposed on or near the image surface 150 of the compact optical system.

The equation of the aspheric surface profiles of the aforementioned lens elements of the 1st embodiment is expressed as follows:

$$X(Y) = (Y^2/R)/(1+\mathrm{sqrt}(1-(1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the compact optical system of the image capturing unit according to the 1st embodiment, when a focal length of the compact optical system is f, an f-number of the compact optical system is Fno, and half of a maximal field of view of the compact optical system is HFOV, these parameters have the following values: f=0.14 millimeters (mm); Fno=2.20;

and HFOV=84.5 degrees (deg.). The value of the aforementioned f-number (Fno) is obtained when the compact optical system is focused on infinity.

When the f-number of the compact optical system is Fno, the following condition is satisfied: FOV=169.0 degrees.

When an Abbe number of the first lens element 110 is V1, an Abbe number of the second lens element 120 is V2, an Abbe number of the third lens element 130 is V3, the following condition is satisfied: V1+V2+V3=64.5.

When a refractive index of the first lens element 110 is N1, a refractive index of the second lens element 120 is N2, a refractive index of the third lens element 130 is N3, the following condition is satisfied: N1+N2+N3=5.022.

When an axial distance between the first lens element 110 and the second lens element 120 is T12, a central thickness of the first lens element 110 is CT1, the following condition is satisfied: T12/CT1=1.84.

When a central thickness of the flat panel 140 is CTf, the central thickness of the first lens element 110 is CT1, the following condition is satisfied: CTf/CT1=1.25.

When a curvature radius of the object-side surface 131 of the third lens element 130 is R5, a curvature radius of the image-side surface 132 of the third lens element 130 is R6, the following condition is satisfied: (R5+R6)/(R5−R6)=0.21.

When the focal length of the compact optical system is f, a focal length of the first lens element 110 is f1, a focal length of the second lens element 120 is f2, a focal length of the third lens element 130 is f3, the following condition is satisfied: |f/f1|+|f/f2|+f/f3|=0.81.

When the focal length of the compact optical system is f, a maximum image height of the compact optical system is ImgH, the following condition is satisfied: f/ImgH=0.27.

When the focal length of the compact optical system is f, an entrance pupil diameter of the compact optical system is EPD, the following condition is satisfied: f/EPD=2.20, wherein the value of the aforementioned entrance pupil diameter (EPD) is obtained when the compact optical system is focused on infinity.

When an axial distance between the imaged object O and the object-side surface 111 of the first lens element 110 is OL, an axial distance between the object-side surface 111 of the first lens element 110 and the image surface 150 is TL, the following condition is satisfied: OL/TL=0.26.

When an axial distance between the imaged object O and the image surface 150 is OTL=4.24 mm.

When the axial distance between the imaged object O and the image surface 150 is OTL, a sum of central thicknesses of the first lens element 110, the second lens element 120 and the third lens element 130 is ΣCT, the following condition is satisfied: OTL/ΣCT=2.22.

When the axial distance between the imaged object O and the image surface 150 is OTL, the maximum image height of the compact optical system is ImgH, the following condition is satisfied: OTL/ImgH=8.34.

When an axial distance between the object-side surface 111 of the first lens element 110 and the image-side surface 132 of the third lens element 130 is TD, the focal length of the compact optical system is f, the following condition is satisfied: TD/f=22.91.

When an axial distance between the stop 100 and the object-side surface 121 of the second lens element 120 is Dsr3, an axial distance between the stop 100 and the object-side surface 131 of the third lens element 130 is Dsr5, the following condition is satisfied: |Dsr3/Dsr5|=0.04.

The detailed optical data of the 1st embodiment are shown in Table 1 and the aspheric surface data are shown in Table 2 below.

TABLE 1

1st Embodiment
f = 0.14 mm, Fno = 2.20, HFOV = 84.5 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Flat Panel | Plano | | 0.737 | Glass | 1.523 | 64.2 | — |
| 2 | | Plano | | 0.143 | | | | |
| 3 | Lens 1 | 42.472 | (ASP) | 0.589 | Plastic | 1.674 | 21.5 | −0.50 |
| 4 | | 0.331 | (ASP) | 1.039 | | | | |
| 5 | Ape. Stop | Plano | | 0.046 | | | | |
| 6 | Lens 2 | 0.703 | (ASP) | 0.907 | Plastic | 1.674 | 21.5 | 0.97 |
| 7 | | −4.342 | (ASP) | 0.201 | | | | |
| 8 | Lens 3 | 0.487 | (ASP) | 0.411 | Plastic | 1.674 | 21.5 | 0.36 |
| 9 | | −0.315 | (ASP) | 0.164 | | | | |
| 10 | Image | Plano | | — | | | | |

Note:
Reference wavelength is 480 nm.

TABLE 2

Aspheric Coefficients

| Surface # | 3 | 4 | 6 |
|---|---|---|---|
| k = | −9.9987E−01 | −5.1522E−01 | 8.1551E−01 |
| A4 = | 2.5345E−02 | 7.5635E+00 | 7.8826E−32 |
| A6 = | 4.3784E−02 | −2.1253E+01 | 2.6020E−63 |
| A8 = | −4.8657E−02 | 1.3223E+02 | — |
| A10 = | 2.2663E−02 | −7.0557E+02 | — |
| A12 = | −5.2380E−03 | 6.0711E+03 | — |
| A14 = | 4.8729E−04 | −3.2973E+04 | — |
| A16 = | −1.3106E−07 | 6.4174E+04 | — |

| Surface # | 7 | 8 | 9 |
|---|---|---|---|
| k = | −1.1768E+01 | −9.6555E+00 | −1.4512E+00 |
| A4 = | −1.6706E+01 | −9.8058E+00 | 4.8582E+00 |
| A6 = | 2.8312E+02 | 1.4240E+02 | 3.9655E+00 |
| A8 = | −2.5732E+03 | −8.3240E+02 | −3.7622E+01 |
| A10 = | 1.1960E+04 | 2.1542E+03 | — |
| A12 = | −2.0337E+04 | −2.5845E+03 | — |
| A14 = | — | 1.1841E+03 | — |

In Table 1, the curvature radius, the thickness and the focal length are shown in millimeters (mm). Surface numbers 0-10 represent the surfaces sequentially arranged from the object-side to the image-side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3A:
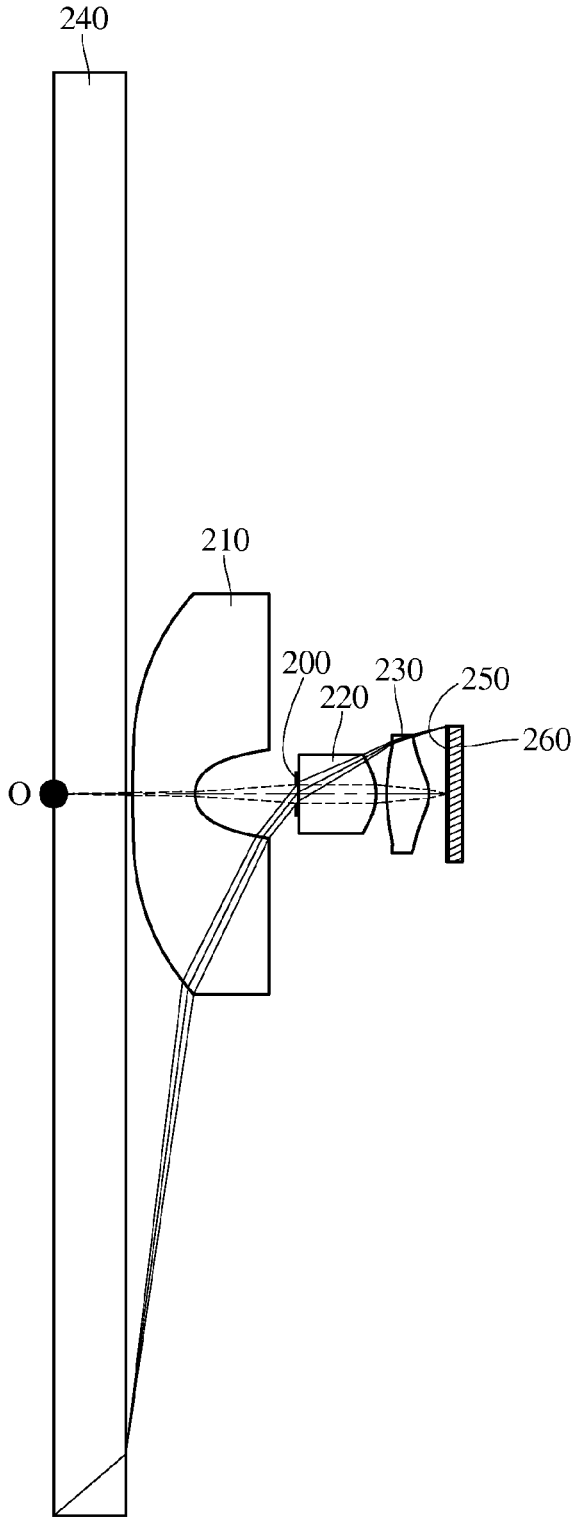
FIG. 3A is a schematic view of an image capturing unit according to the 2nd embodiment of the present disclosure.
Figure 3B:
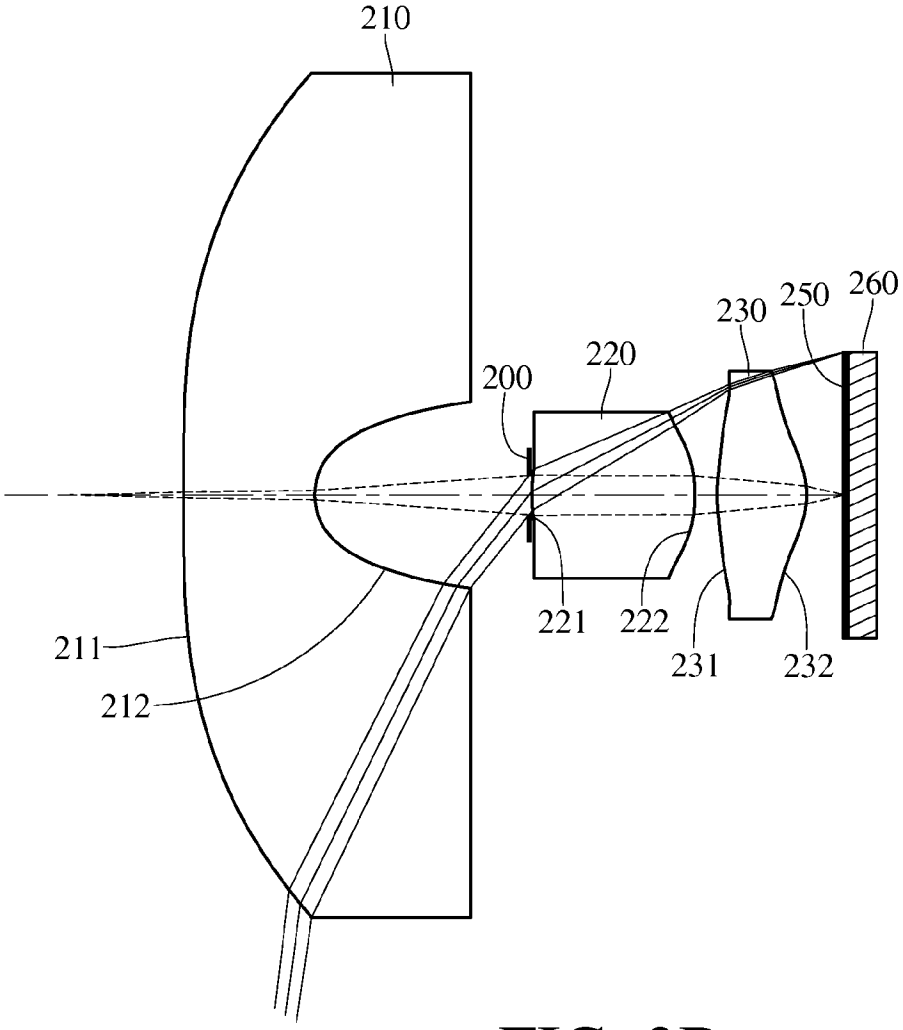
FIG. 3B is a partially enlarged schematic view of the image capturing unit in FIG. 3A.
Figure 4:
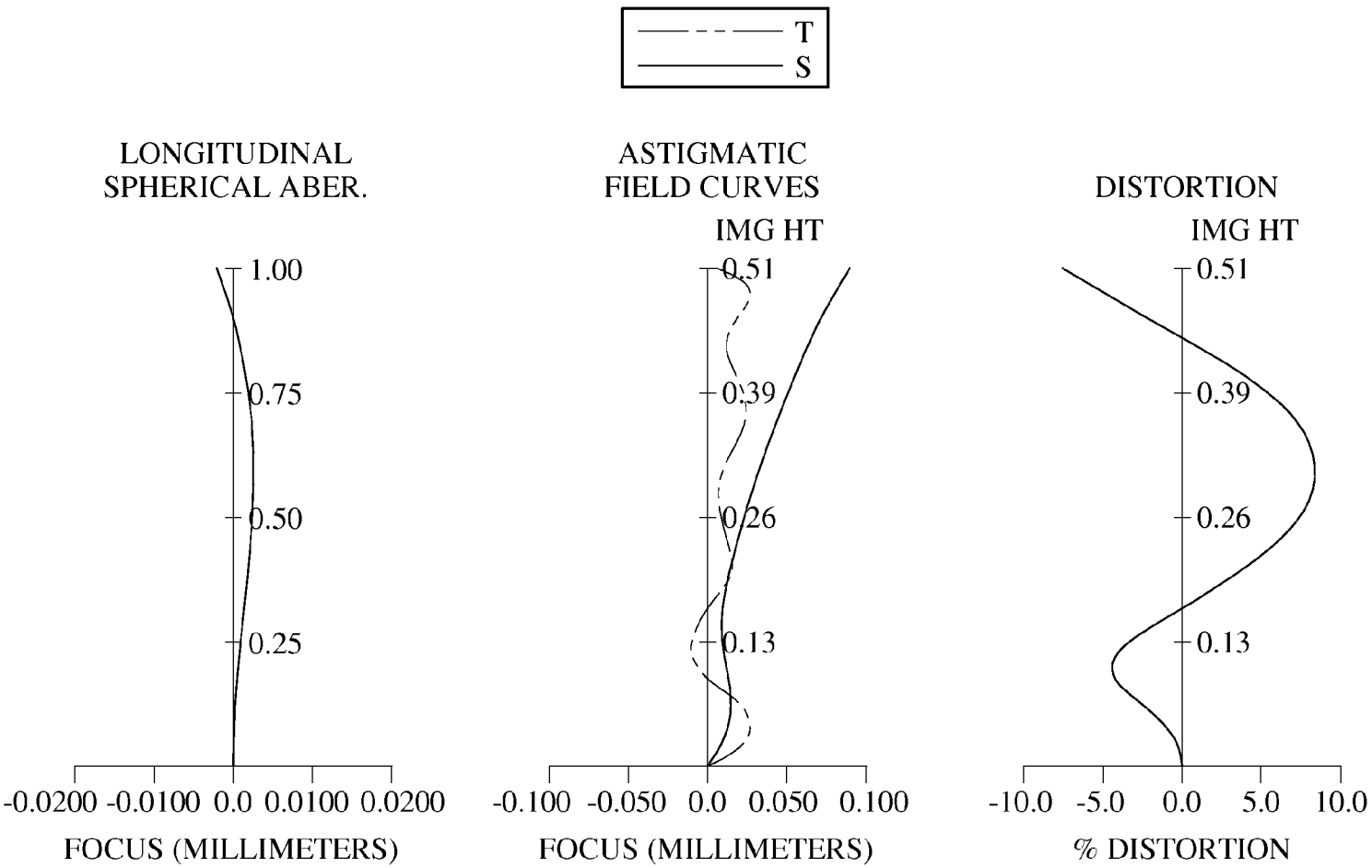
FIG. 4 shows spherical aberration curves, astigmatic field curves and a distortion curve of the image capturing unit according to the 2nd embodiment.

FIG. 3A is a schematic view of an image capturing unit according to the 2nd embodiment of the present disclosure. FIG. 3B is a partially enlarged schematic view of the image capturing unit in FIG. 3A. FIG. 4 shows spherical aberration curves, astigmatic field curves and a distortion curve of the image capturing unit according to the 2nd embodiment. In FIG. 3A and FIG. 3B, the image capturing unit includes the compact optical system (its reference numeral is omitted) of the present disclosure and an image sensor 260. The compact optical system includes, in order from an object side to an image side, a flat panel 240, a first lens element 210, an aperture stop 200, a second lens element 220, a third lens element 230 and an image surface 250, wherein the compact optical system has a total of three lens elements (210-230) with refractive power. The first lens element 210, the second lens element 220 and the third lens element 230 are all stationary relative to one another in a paraxial region thereof.

The first lens element 210 with negative refractive power has an object-side surface 211 being convex in a paraxial region thereof and an image-side surface 212 being concave in a paraxial region thereof. The first lens element 210 is made of plastic material, and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material, and has the object-side surface 231 and the image-side surface 232 being both aspheric. The object-side surface 231 and the image-side surface 232 of the third lens element 230 have at least one inflection point.

The flat panel 240 is made of glass and located between an imaged object O and the first lens element 210, and will not affect the focal length of the compact optical system. The image sensor 260 is disposed on or near the image surface 250 of the compact optical system.

The detailed optical data of the 2nd embodiment are shown in Table 3 and the aspheric surface data are shown in Table 4 below.

TABLE 3

2nd Embodiment
f = 0.10 mm, Fno = 2.10, HFOV = 82.4 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Flat Panel | Plano | | 0.550 | Glass | 1.523 | 64.2 | — |
| 2 | | Plano | | 0.050 | | | | |
| 3 | Lens 1 | 31.696 | (ASP) | 0.475 | Plastic | 1.661 | 23.3 | −0.37 |
| 4 | | 0.244 | (ASP) | 0.775 | | | | |
| 5 | Ape. Stop | Plano | | 0.010 | | | | |
| 6 | Lens 2 | 0.644 | (ASP) | 0.590 | Plastic | 1.661 | 23.3 | 0.60 |
| 7 | | −0.666 | (ASP) | 0.081 | | | | |
| 8 | Lens 3 | 0.485 | (ASP) | 0.324 | Plastic | 1.674 | 21.5 | 0.32 |
| 9 | | −0.289 | (ASP) | 0.133 | | | | |
| 10 | Image | Plano | | — | | | | |

Note:
Reference wavelength is 480 nm.

TABLE 4

Aspheric Coefficients

| Surface # | 3 | 4 | 6 |
|---|---|---|---|
| k = | −9.9987E−01 | −5.1522E−01 | 3.7355E−01 |
| A4 = | 2.1227E−01 | 1.8634E+01 | 1.8966E−31 |
| A6 = | −1.5024E−01 | −9.5138E+01 | 1.1212E−62 |
| A8 = | 6.9193E−02 | 1.0756E+03 | — |
| A10 = | −1.0759E−02 | −1.0428E+04 | — |
| A12 = | −3.8825E−03 | 1.6303E+05 | — |
| A14 = | 1.7994E−03 | −1.6088E+06 | — |
| A16 = | −2.0157E−04 | 5.6892E+06 | — |
| **Surface #** | **7** | **8** | **9** |
| k = | −4.7025E−01 | −5.4711E+01 | −7.1549E−01 |
| A4 = | −2.2916E+01 | −3.1050E+00 | 1.2747E+01 |
| A6 = | 4.8764E+02 | 4.4635E+01 | −3.4918E+01 |
| A8 = | −4.9292E+03 | 2.7280E+02 | 5.2167E+01 |
| A10 = | 2.6991E+04 | −7.8370E+03 | — |
| A12 = | −5.8653E+04 | 4.8880E+04 | — |
| A14 = | — | −1.0511E+05 | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 0.10 | \|f/f1\| + \|f/f2\| + \|f/f3\| | 0.74 |
| Fno | 2.10 | f/ImgH | 0.19 |
| HFOV [deg.] | 82.4 | f/EPD | 2.10 |
| FOV [deg.] | 164.8 | OL/TL | 0.25 |
| V1 + V2 + V3 | 68.1 | OTL [mm] | 2.99 |
| N1 + N2 + N3 | 4.997 | OTL/ΣCT | 2.15 |
| T12/CT1 | 1.65 | OTL/ImgH | 5.81 |
| CTf/CT1 | 1.16 | TD/f | 22.61 |
| (R5 + R6)/(R5 − R6) | 0.25 | \|Dsr3/Dsr5\| | 0.01 |

3rd Embodiment

Figure 5A:
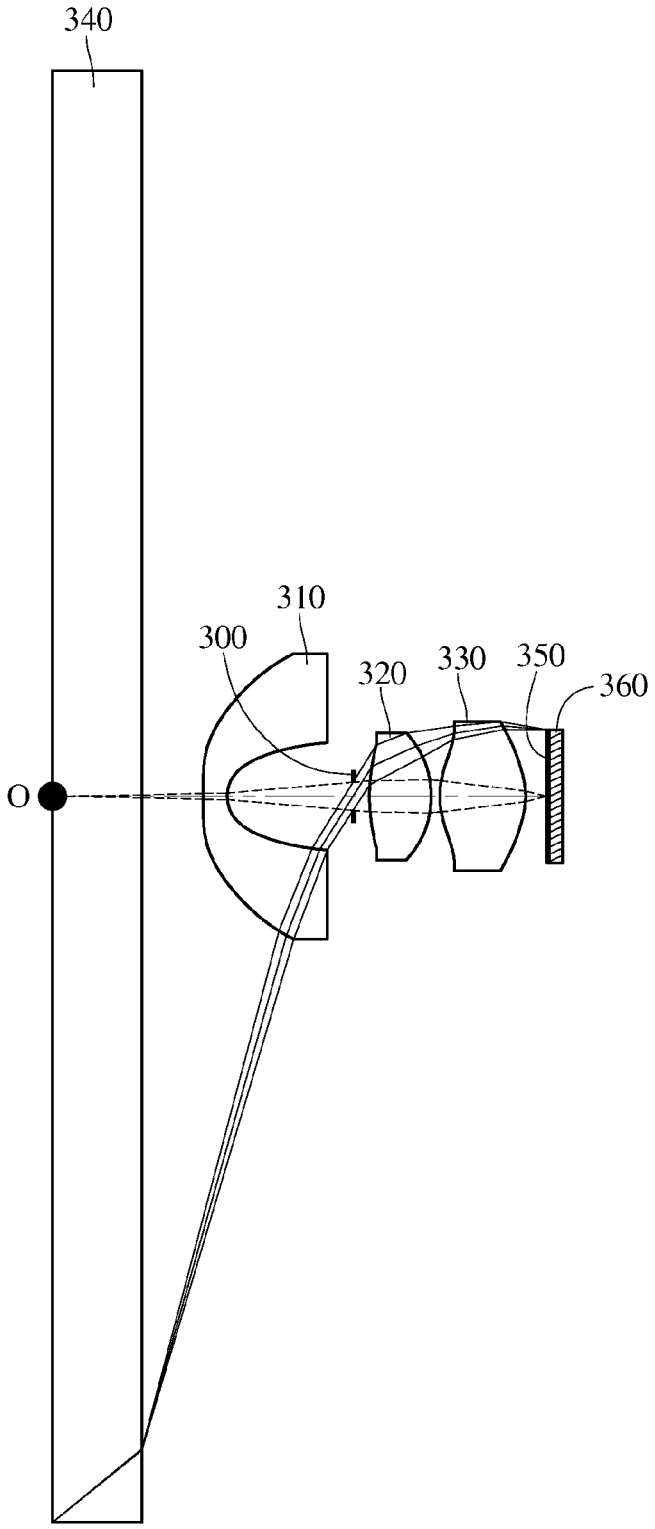
FIG. 5A is a schematic view of an image capturing unit according to the 3rd embodiment of the present disclosure.
Figure 5B:
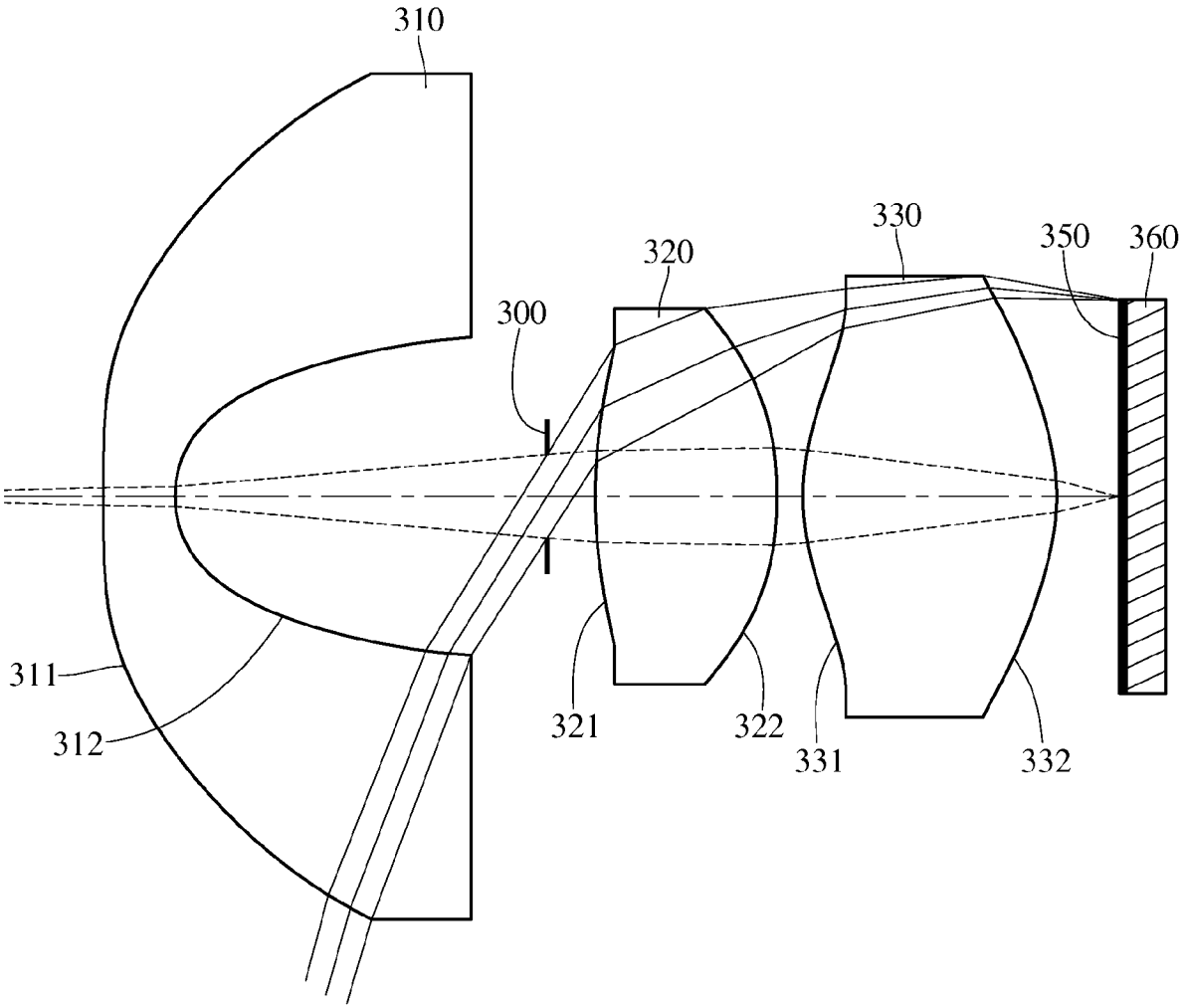
FIG. 5B is a partially enlarged schematic view of the image capturing unit in FIG. 5A.
Figure 6:
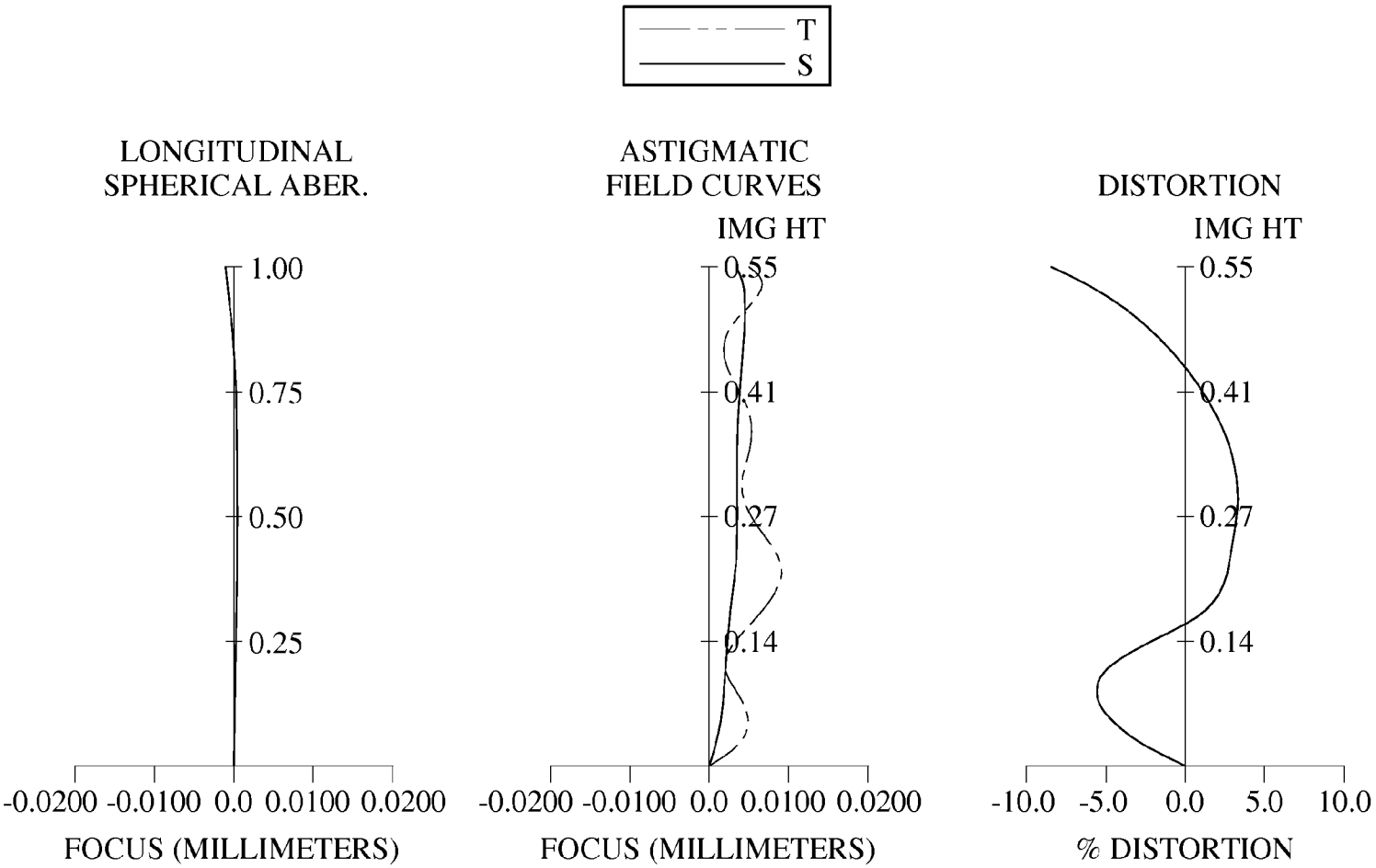
FIG. 6 shows spherical aberration curves, astigmatic field curves and a distortion curve of the image capturing unit according to the 3rd embodiment.

FIG. 5A is a schematic view of an image capturing unit according to the 3rd embodiment of the present disclosure. FIG. 5B is a partially enlarged schematic view of the image capturing unit in FIG. 5A. FIG. 6 shows spherical aberration curves, astigmatic field curves and a distortion curve of the image capturing unit according to the 3rd embodiment. In FIG. 5A and FIG. 5B, the image capturing unit includes the compact optical system (its reference numeral is omitted) of the present disclosure and an image sensor 360. The compact optical system includes, in order from an object side to an image side, a flat panel 340, a first lens element 310, an aperture stop 300, a second lens element 320, a third lens element 330 and an image surface 350, wherein the compact optical system has a total of three lens elements (310-330) with refractive power. The first lens element 310, the second lens element 320 and the third lens element 330 are all stationary relative to one another in a paraxial region thereof.

The first lens element 310 with negative refractive power has an object-side surface 311 being convex in a paraxial region thereof and an image-side surface 312 being concave in a paraxial region thereof. The first lens element 310 is made of plastic material, and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material, and has the object-side surface 331 and the image-side surface 332 being both aspheric. The object-side surface 331 and the image-side surface 332 of the third lens element 330 have at least one inflection point.

The flat panel 340 is made of glass and located between an imaged object O and the first lens element 310, and will not affect the focal length of the compact optical system. The image sensor 360 is disposed on or near the image surface 350 of the compact optical system.

The detailed optical data of the 3rd embodiment are shown in Table 5 and the aspheric surface data are shown in Table 6 below.

TABLE 5

3rd Embodiment
f = 0.14 mm, Fno = 2.00, HFOV = 74.3 deg.

| Surface # | | Curvature Radius | Thickness | Material | Index | Abbe # | Focal Length |
|---|---|---|---|---|---|---|---|
| 0 | Object | Plano | 0.000 | | | | |
| 1 | Flat Panel | Plano | 0.737 | Glass | 1.523 | 64.2 | — |
| 2 | | Plano | 0.505 | | | | |
| 3 | Lens 1 | 42.472 (ASP) | 0.200 | Plastic | 1.674 | 21.5 | −0.47 |
| 4 | | 0.311 (ASP) | 1.039 | | | | |
| 5 | Ape. Stop | Plano | 0.135 | | | | |
| 6 | Lens 2 | 1.397 (ASP) | 0.508 | Plastic | 1.661 | 23.3 | 0.96 |
| 7 | | −0.992 (ASP) | 0.072 | | | | |
| 8 | Lens 3 | 0.629 (ASP) | 0.709 | Plastic | 1.674 | 21.5 | 0.60 |
| 9 | | −0.625 (ASP) | 0.174 | | | | |
| 10 | Image | Plano | — | | | | |

Note:
Reference wavelength is 480 nm.

TABLE 6

Aspheric Coefficients

| Surface # | 3 | 4 | 6 |
|---|---|---|---|
| k = | −9.9987E−01 | −5.1522E−01 | −9.0865E+00 |
| A4 = | 1.6180E+00 | 8.0055E+00 | 7.8826E−32 |
| A6 = | −2.7423E+00 | −2.3142E+01 | 1.0758E−59 |
| A8 = | 2.5003E+00 | 1.4814E+02 | — |
| A10 = | −9.2504E−01 | −8.1321E+02 | — |
| A12 = | −2.2419E−01 | 7.1988E+03 | — |
| A14 = | 3.0513E−01 | −4.0224E+04 | — |
| A16 = | −7.2247E−02 | 8.0542E+04 | — |
| **Surface #** | **7** | **8** | **9** |
| k = | −5.6437E−01 | −4.0679E+00 | −3.2004E−01 |
| A4 = | −1.5072E+00 | −3.3687E−01 | 2.2964E+00 |
| A6 = | 2.7810E+00 | 1.0720E+00 | −5.8735E+00 |
| A8 = | 4.8165E+00 | −8.6659E+00 | 8.0988E+00 |
| A10 = | −3.1535E+01 | −4.4549E+00 | — |
| A12 = | 4.3669E+01 | 6.7302E+01 | — |
| A14 = | — | −7.0683E+01 | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.14 | \|f/f1\| + \|f/f2\| + \|f/f3\| | 0.70 |
| Fno | 2.00 | f/ImgH | 0.26 |
| HFOV [deg.] | 74.3 | f/EPD | 2.00 |
| FOV [deg.] | 148.6 | OL/TL | 0.44 |
| V1 + V2 + V3 | 66.3 | OTL [mm] | 4.08 |
| N1 + N2 + N3 | 5.010 | OTL/ΣCT | 2.88 |
| T12/CT1 | 5.87 | OTL/ImgH | 7.45 |
| CTf/CT1 | 3.69 | TD/f | 18.43 |
| (R5 + R6)/(R5 − R6) | 0.003 | \|Dsr3/Dsr5\| | 0.19 |

4th Embodiment

Figure 7A:
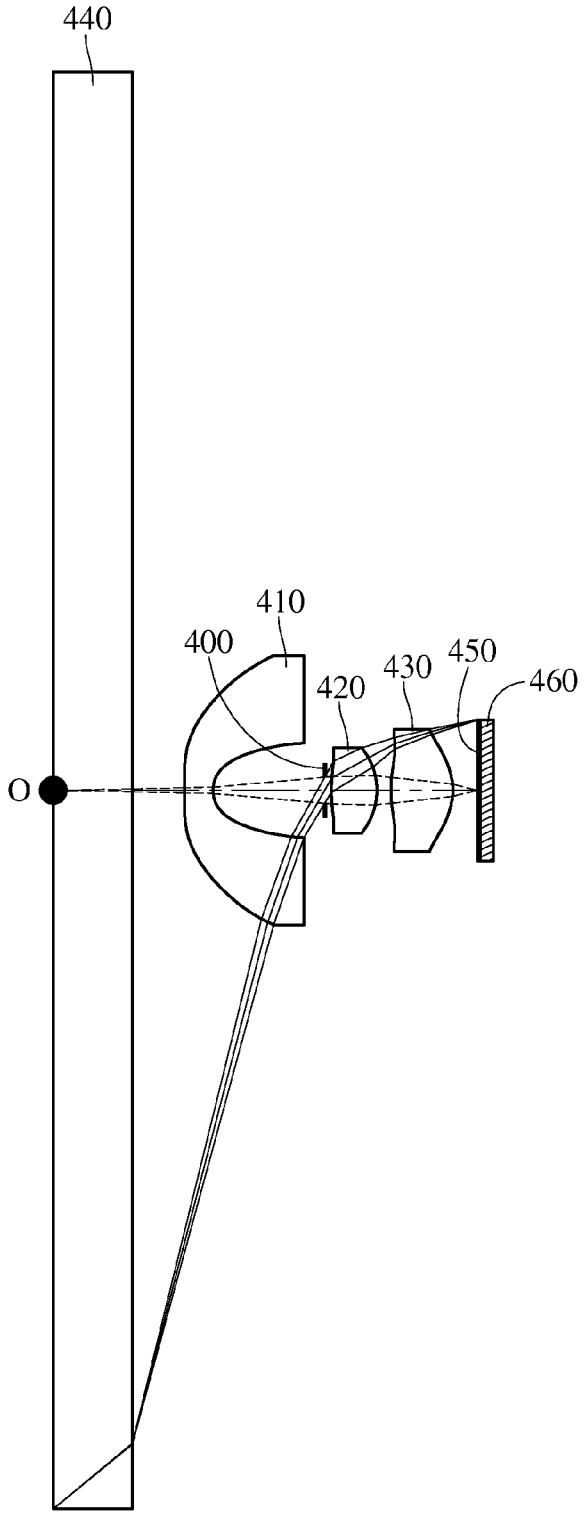
FIG. 7A is a schematic view of an image capturing unit according to the 4th embodiment of the present disclosure.
Figure 7B:
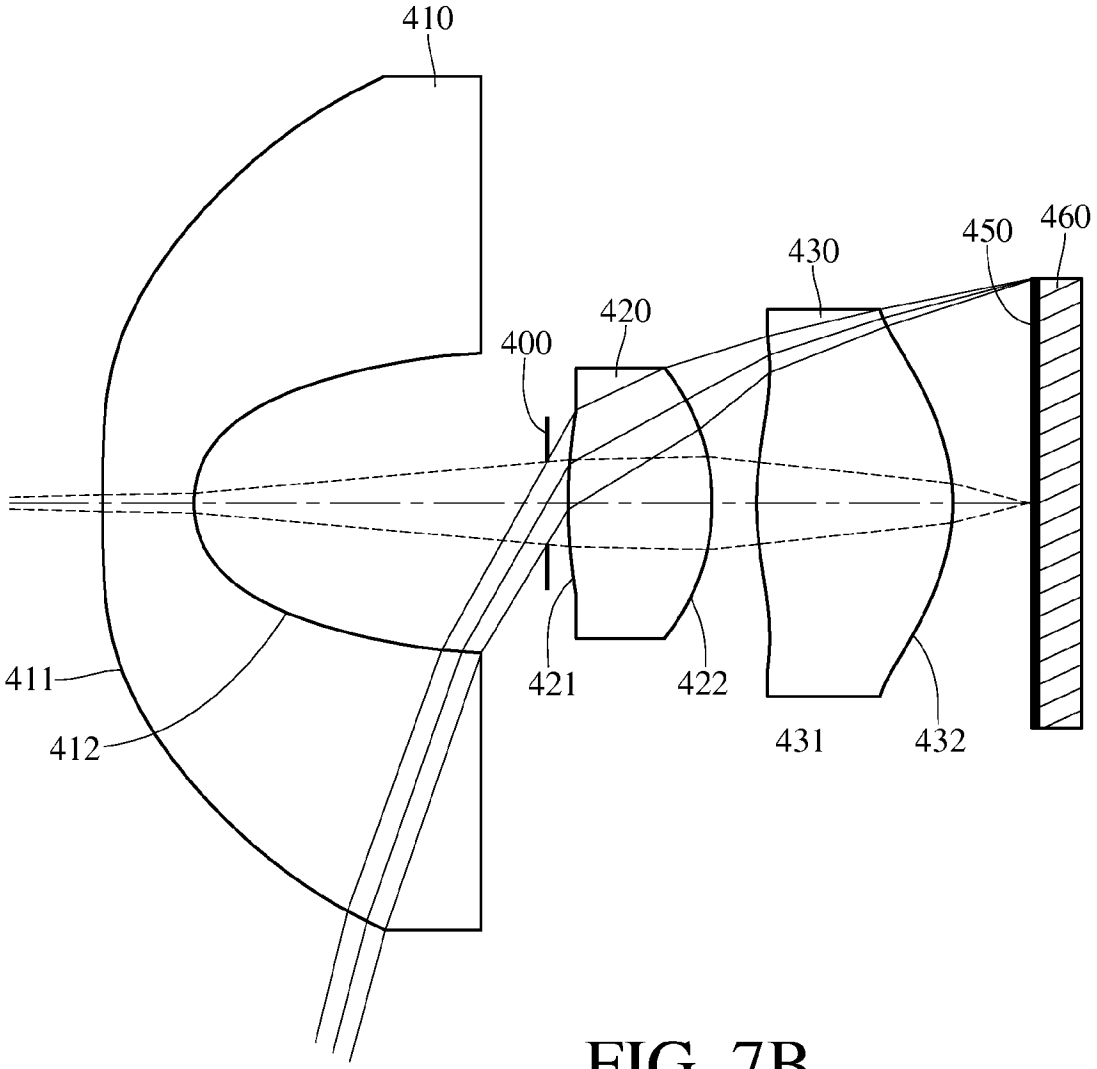
FIG. 7B is a partially enlarged schematic view of the image capturing unit in FIG. 7A.
Figure 8:
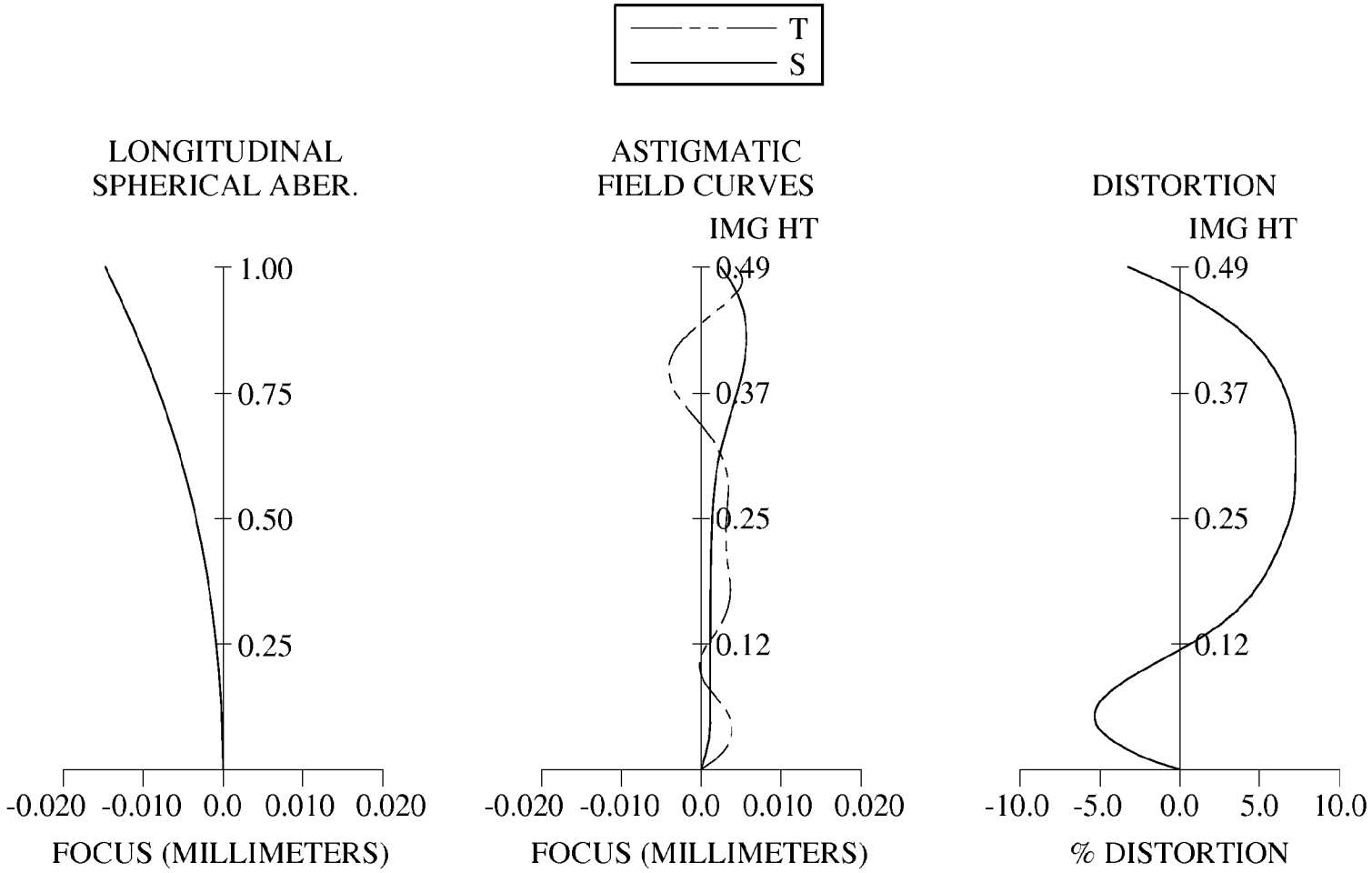
FIG. 8 shows spherical aberration curves, astigmatic field curves and a distortion curve of the image capturing unit according to the 4th embodiment.

FIG. 7A is a schematic view of an image capturing unit according to the 4th embodiment of the present disclosure. FIG. 7B is a partially enlarged schematic view of the image capturing unit in FIG. 7A. FIG. 8 shows spherical aberration curves, astigmatic field curves and a distortion curve of the image capturing unit according to the 4th embodiment. In FIG. 7A and FIG. 7B, the image capturing unit includes the compact optical system (its reference numeral is omitted) of the present disclosure and an image sensor 460. The compact optical system includes, in order from an object side to an image side, a flat panel 440, a first lens element 410, an aperture stop 400, a second lens element 420, a third lens element 430 and an image surface 450, wherein the compact optical system has a total of three lens elements (410-430) with refractive power. The first lens element 410, the second lens element 420 and the third lens element 430 are all stationary relative to one another in a paraxial region thereof.

The first lens element 410 with negative refractive power has an object-side surface 411 being convex in a paraxial region thereof and an image-side surface 412 being concave in a paraxial region thereof. The first lens element 410 is made of plastic material, and has the object-side surface 411 and the image-side surface 412 being both aspheric.

The second lens element 420 with positive refractive power has an object-side surface 421 being convex in a paraxial region thereof and an image-side surface 422 being convex in a paraxial region thereof. The second lens element 420 is made of plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material, and has the object-side surface 431 and the image-side surface 432 being both aspheric. The object-side surface 431 and the image-side surface 432 of the third lens element 430 have at least one inflection point.

The flat panel 440 is made of glass and located between an imaged object O and the first lens element 410, and will not affect the focal length of the compact optical system. The image sensor 460 is disposed on or near the image surface 450 of the compact optical system.

The detailed optical data of the 4th embodiment are shown in Table 7 and the aspheric surface data are shown in Table 8 below.

TABLE 7

4th Embodiment
f = 0.11 mm, Fno = 2.00, HFOV = 75.5 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Flat Panel | Plano | | 0.550 | Glass | 1.523 | 64.2 | — |
| 2 | | Plano | | 0.361 | | | | |
| 3 | Lens 1 | 31.696 | (ASP) | 0.200 | plastic | 1.674 | 21.5 | −0.34 |
| 4 | | 0.230 | (ASP) | 0.775 | | | | |
| 5 | Ape. Stop | Plano | | 0.047 | | | | |
| 6 | Lens 2 | 1.182 | (ASP) | 0.316 | Plastic | 1.661 | 23.3 | 0.59 |
| 7 | | −0.523 | (ASP) | 0.098 | | | | |
| 8 | Lens 3 | 0.701 | (ASP) | 0.431 | Plastic | 1.674 | 21.5 | 0.47 |
| 9 | | −0.434 | (ASP) | 0.173 | | | | |
| 10 | Image | Plano | | — | | | | |

Note:
Reference wavelength is 480 nm.

TABLE 8

Aspheric Coefficients

| | Surface # | | |
|---|---|---|---|
| | 3 | 4 | 6 |
| k = | −9.9987E−01 | −5.1522E−01 | −7.6822E+00 |
| A4 = | 3.0712E+00 | 1.9262E+01 | 1.8966E−31 |
| A6 = | −7.8509E+00 | −9.9985E+01 | 4.3187E−59 |
| A8 = | 1.0861E+01 | 1.1492E+03 | — |
| A10 = | −4.7991E+00 | −1.1328E+04 | — |
| A12 = | −6.4306E+00 | 1.8006E+05 | — |
| A14 = | 9.4595E+00 | −1.8065E+06 | — |
| A16 = | −3.5569E+00 | 6.4953E+06 | — |

| | Surface # | | |
|---|---|---|---|
| | 7 | 8 | 9 |
| k = | −9.1753E−01 | −8.8837E+00 | −3.3096E−01 |
| A4 = | −4.1660E+00 | −1.6434E+00 | 3.2705E+00 |
| A6 = | 9.9102E+00 | −2.8362E+01 | −1.6737E+01 |
| A8 = | 3.3776E+02 | 2.8018E+02 | 8.6517E+01 |

TABLE 8-continued

| Aspheric Coefficients | | | |
|---|---|---|---|
| A10 = | −3.8793E+03 | −1.1781E+03 | — |
| A12 = | 1.3258E+04 | 2.6959E+03 | — |
| A14 = | — | −2.8184E+03 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.11 | \|f/f1\| + \|f/f2\| + \|f/f3\| | 0.75 |
| Fno | 2.00 | f/ImgH | 0.23 |
| HFOV [deg.] | 75.5 | f/EPD | 2.00 |
| FOV [deg.] | 151.0 | OL/TL | 0.45 |
| V1 + V2 + V3 | 66.3 | OTL [mm] | 2.95 |
| N1 + N2 + N3 | 5.010 | OTL/ΣCT | 3.12 |
| T12/CT1 | 4.11 | OTL/ImgH | 6.01 |
| CTf/CT1 | 2.75 | TD/f | 16.80 |
| (R5 + R6)/(R5 − R6) | 0.23 | \|Dsr3/Dsr5\| | 0.10 |

5th Embodiment

Figure 9A:
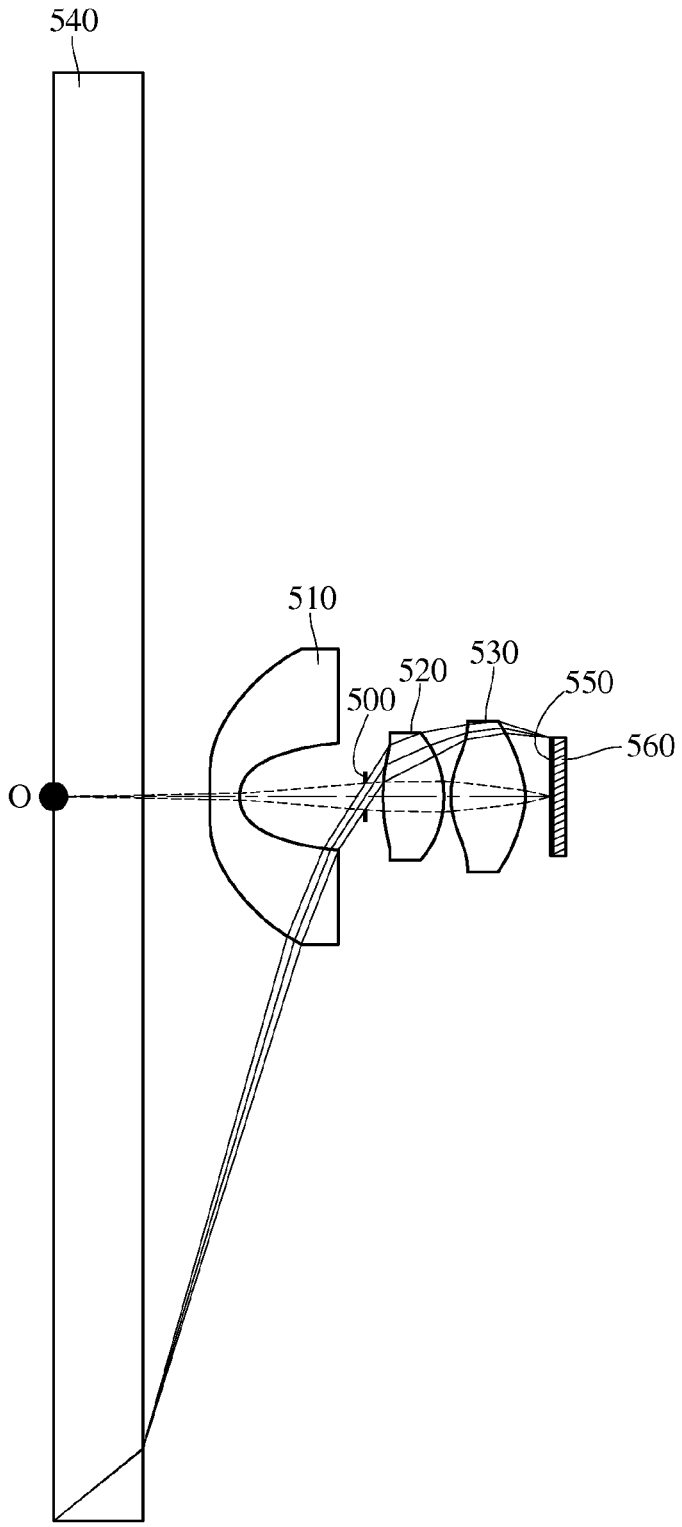
FIG. 9A is a schematic view of an image capturing unit according to the 5th embodiment of the present disclosure.
Figure 9B:
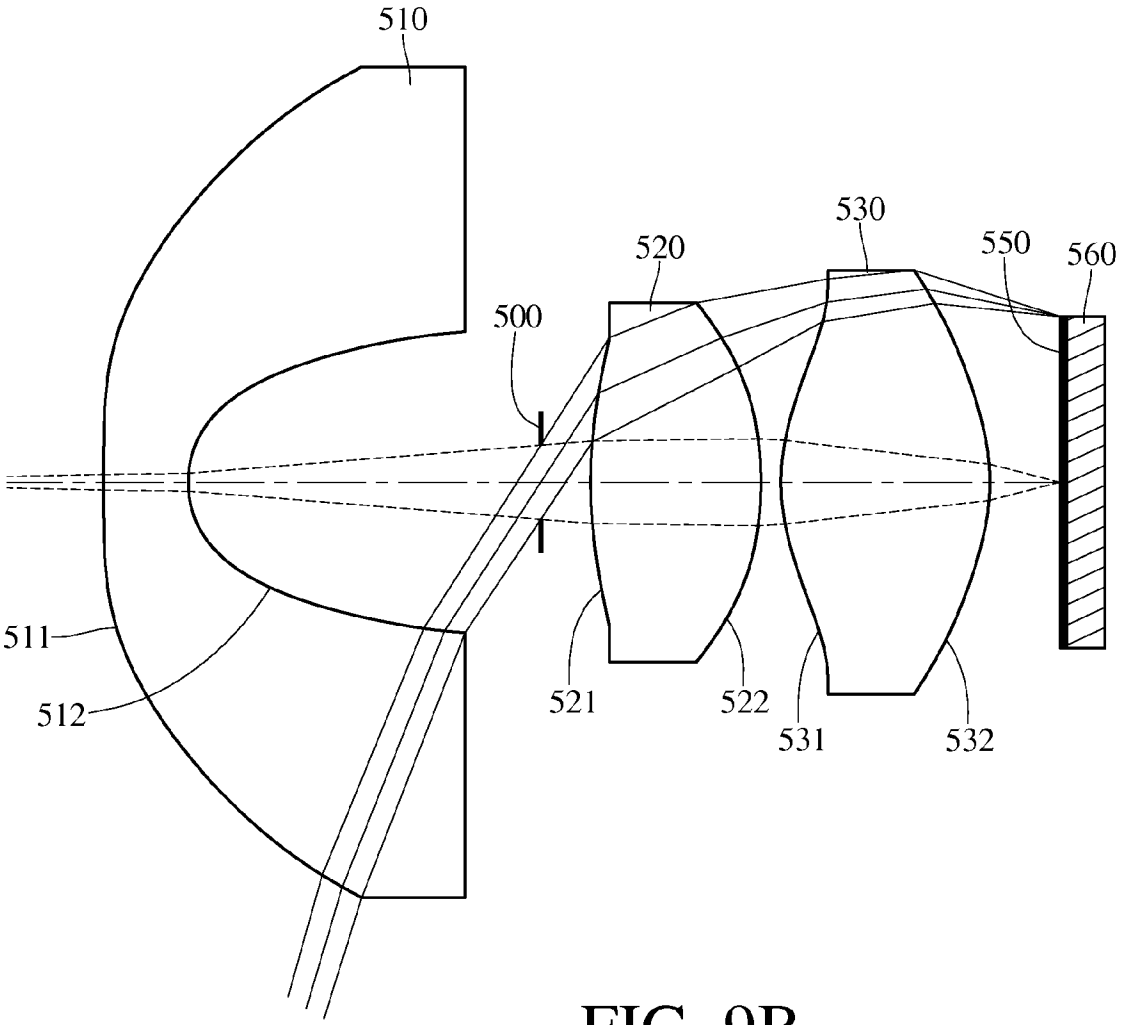
FIG. 9B is a partially enlarged schematic view of the image capturing unit in FIG. 9A.
Figure 10:
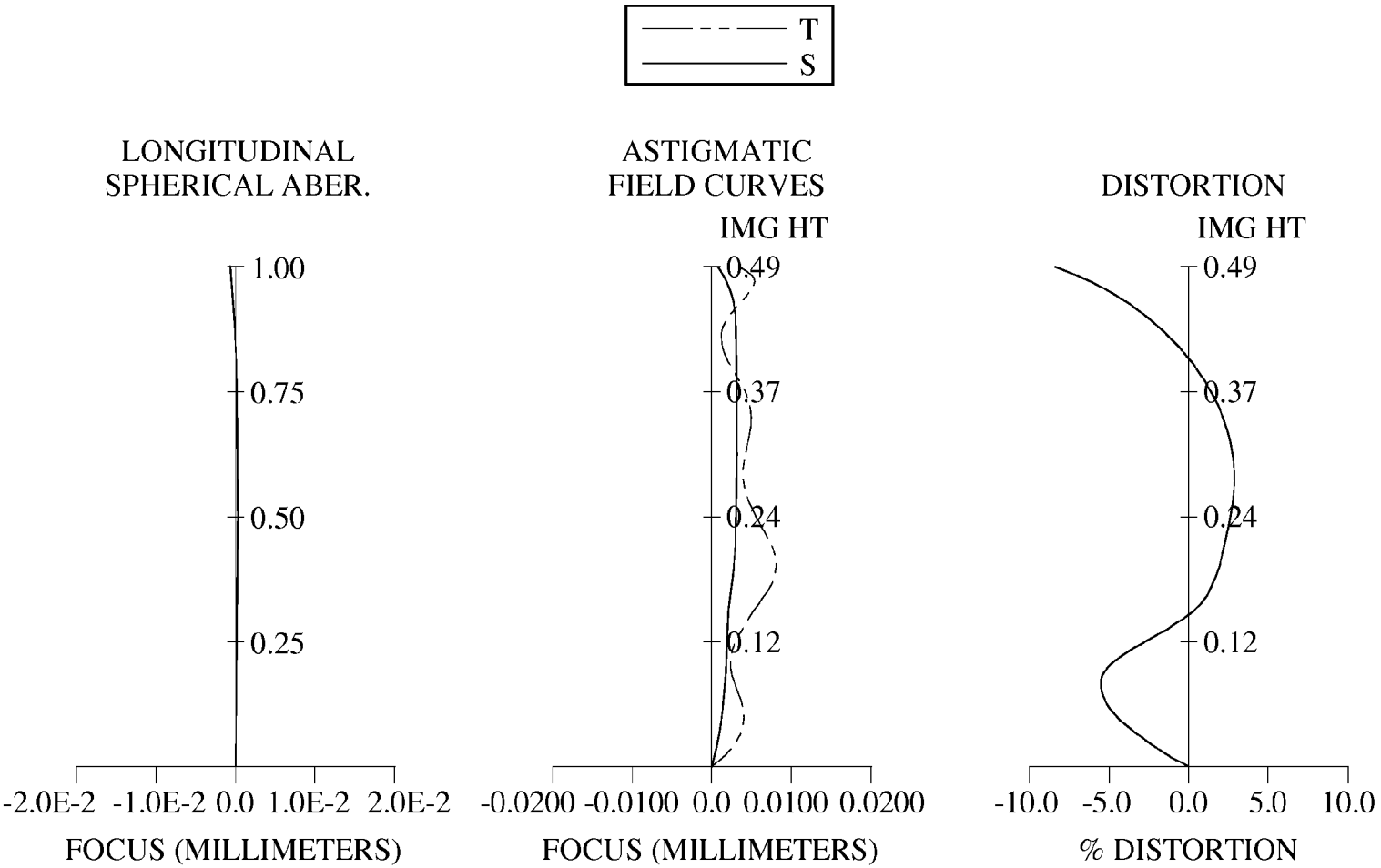
FIG. 10 shows spherical aberration curves, astigmatic field curves and a distortion curve of the image capturing unit according to the 5th embodiment.

FIG. 9A is a schematic view of an image capturing unit according to the 5th embodiment of the present disclosure. FIG. 9B is a partially enlarged schematic view of the image capturing unit in FIG. 9A. FIG. 10 shows spherical aberration curves, astigmatic field curves and a distortion curve of the image capturing unit according to the 5th embodiment. In FIG. 9A and FIG. 9B, the image capturing unit includes the compact optical system (its reference numeral is omitted) of the present disclosure and an image sensor 560. The compact optical system includes, in order from an object side to an image side, a flat panel 540, a first lens element 510, an aperture stop 500, a second lens element 520, a third lens element 530 and an image surface 550, wherein the compact optical system has a total of three lens elements (510-530) with refractive power. The first lens element 510, the second lens element 520 and the third lens element 530 are all stationary relative to one another in a paraxial region thereof.

The first lens element 510 with negative refractive power has an object-side surface 511 being convex in a paraxial region thereof and an image-side surface 512 being concave in a paraxial region thereof. The first lens element 510 is made of plastic material, and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material, and has the object-side surface 531 and the image-side surface 532 being both aspheric. The object-side surface 531 of the third lens element 530 has at least one inflection point.

The flat panel 540 is made of glass and located between an imaged object O and the first lens element 510, and will not affect the focal length of the compact optical system. The image sensor 560 is disposed on or near the image surface 550 of the compact optical system.

The detailed optical data of the 5th embodiment are shown in Table 9 and the aspheric surface data are shown in Table 10 below.

TABLE 9

| 5th Embodiment<br>f = 0.14 mm, Fno = 2.00, HFOV = 73.4 deg. | | | | | | | |
|---|---|---|---|---|---|---|---|
| Surface # | | Curvature Radius | Thickness | Material | Index | Abbe # | Focal Length |
| 0 | Object | Plano | 0.000 | | | | |
| 1 | Flat Panel | Plano | 0.737 | Glass | 1.523 | 64.2 | — |
| 2 | | Plano | 0.552 | | | | |
| 3 | Lens 1 | 42.472 (ASP) | 0.249 | Plastic | 1.674 | 21.5 | −0.47 |
| 4 | | 0.311 (ASP) | 1.039 | | | | |
| 5 | Ape. Stop | Plano | 0.147 | | | | |
| 6 | Lens 2 | 1.381 (ASP) | 0.502 | Plastic | 1.661 | 23.3 | 0.99 |
| 7 | | −1.057 (ASP) | 0.059 | | | | |
| 8 | Lens 3 | 0.604 (ASP) | 0.615 | Plastic | 1.674 | 21.5 | 0.57 |
| 9 | | −0.624 (ASP) | 0.207 | | | | |
| 10 | Image | Plano | — | | | | |

Note:
Reference wavelength is 480 nm.

TABLE 10

| Aspheric Coefficients | | | |
|---|---|---|---|
| | Surface # | | |
| | 3 | 4 | 6 |
| k = | −9.9987E−01 | −5.1522E−01 | −1.0055E+01 |
| A4 = | 1.4034E+00 | 8.0055E+00 | 7.8826E−32 |
| A6 = | −2.2020E+00 | −2.3142E+01 | −6.6466E−60 |
| A8 = | 1.8647E+00 | 1.4814E+02 | — |
| A10 = | −6.2729E−01 | −8.1321E+02 | — |

TABLE 10-continued

| Aspheric Coefficients | | | |
|---|---|---|---|
| A12 = | −1.7041E−01 | 7.1988E+03 | — |
| A14 = | 1.9992E−01 | −4.0224E+04 | — |
| A16 = | −4.4073E−02 | 8.0542E+04 | — |

| | Surface # | | |
|---|---|---|---|
| | 7 | 8 | 9 |
| k = | −6.9910E−01 | −3.6343E+00 | −3.0516E−01 |
| A4 = | −1.3267E+00 | −2.3442E−01 | 2.1915E+00 |
| A6 = | 1.9601E+00 | 2.6443E−01 | −5.2437E+00 |
| A8 = | 6.9811E+00 | −2.3494E+00 | 6.7749E+00 |
| A10 = | −3.4744E+01 | −2.3961E+01 | — |
| A12 = | 4.7385E+01 | 9.1454E+01 | — |
| A14 = | — | −8.0498E+01 | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.14 | \|f/f1\| + \|f/f2\| + \|f/f3\| | 0.67 |
| Fno | 2.00 | f/ImgH | 0.28 |
| HFOV [deg.] | 73.4 | f/EPD | 2.00 |
| FOV [deg.] | 146.8 | OL/TL | 0.46 |
| V1 + V2 + V3 | 66.3 | OTL [mm] | 4.11 |
| N1 + N2 + N3 | 5.010 | OTL/ΣCT | 3.01 |
| T12/CT1 | 4.76 | OTL/ImgH | 8.41 |
| CTf/CT1 | 2.96 | TD/f | 19.25 |
| (R5 + R6)/(R5 − R6) | −0.02 | \|Dsr3/Dsr5\| | 0.21 |

6th Embodiment

Figure 11A:
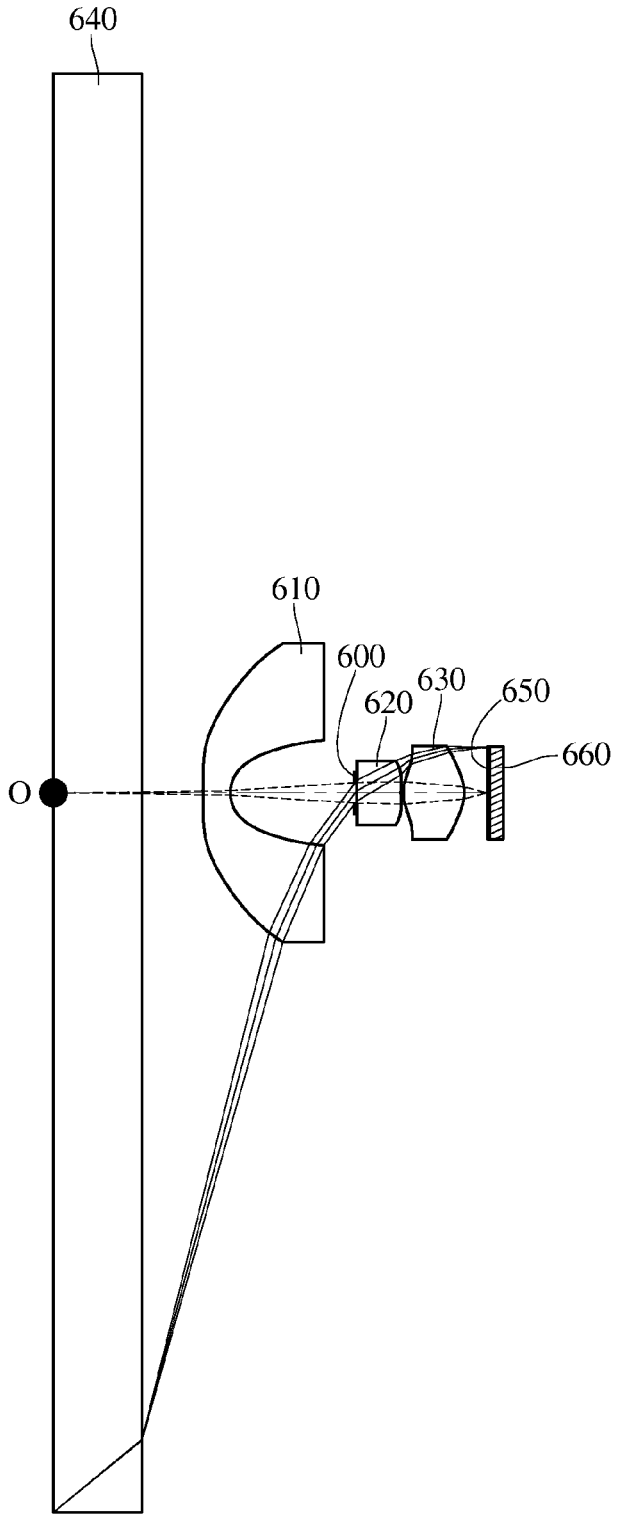
FIG. 11A is a schematic view of an image capturing unit according to the 6th embodiment of the present disclosure.
Figure 11B:
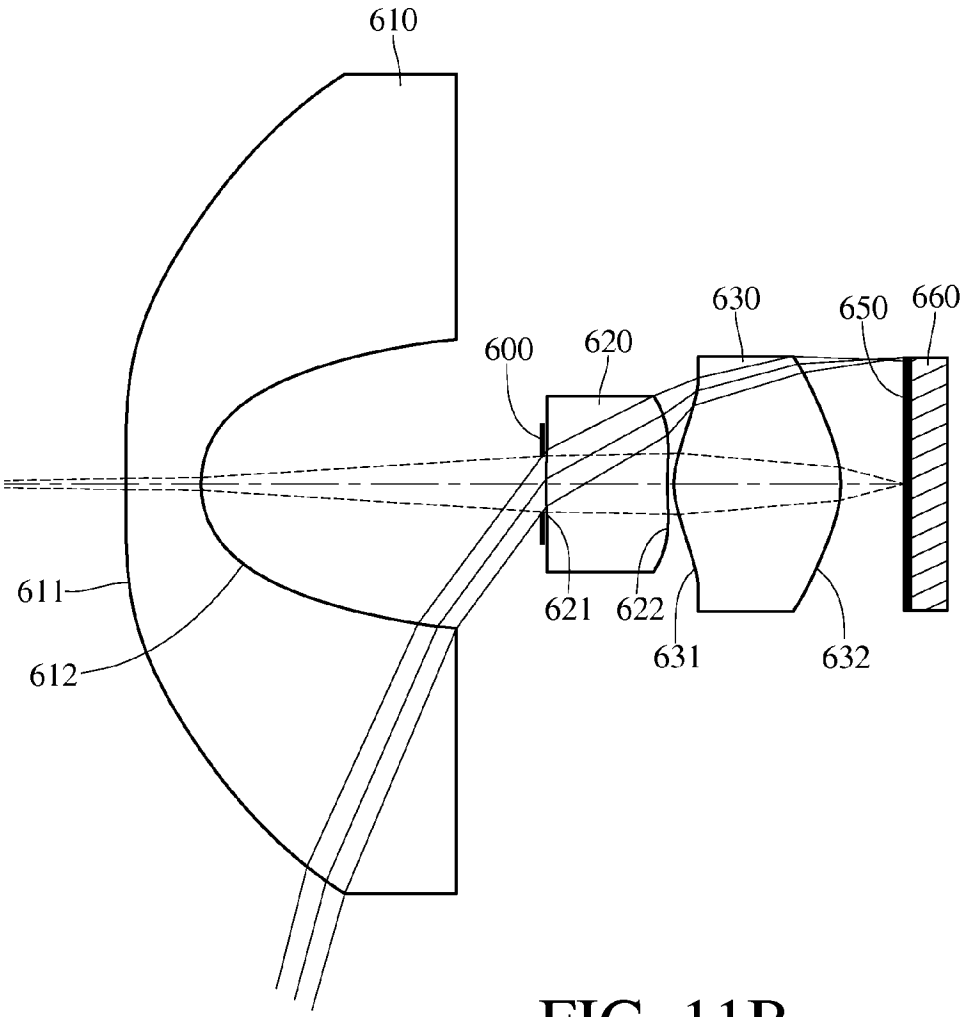
FIG. 11B is a partially enlarged schematic view of the image capturing unit in FIG. 11A.
Figure 12:
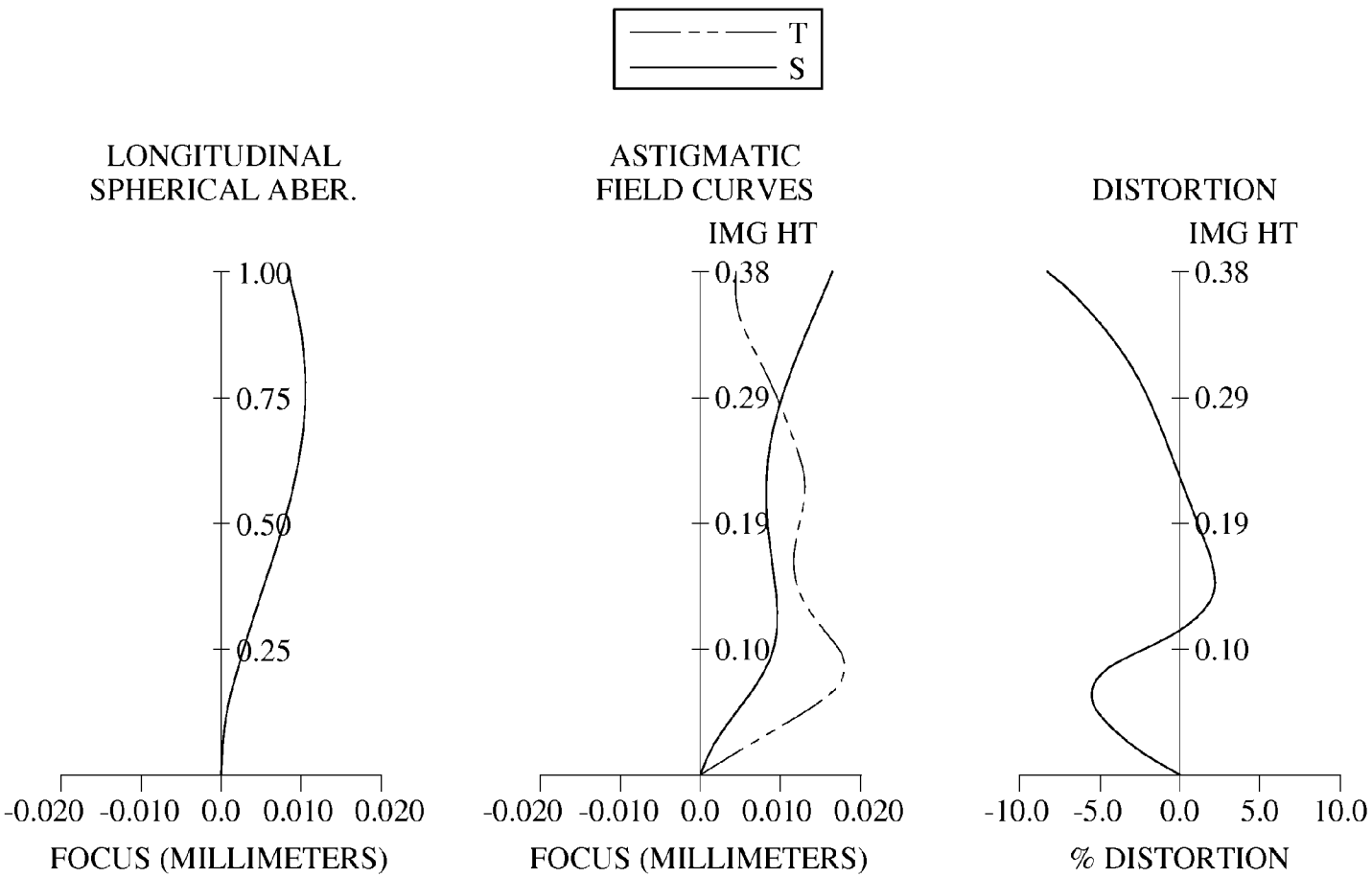
FIG. 12 shows spherical aberration curves, astigmatic field curves and a distortion curve of the image capturing unit according to the 6th embodiment.

FIG. 11A is a schematic view of an image capturing unit according to the 6th embodiment of the present disclosure. FIG. 11B is a partially enlarged schematic view of the image capturing unit in FIG. 11A. FIG. 12 shows spherical aberration curves, astigmatic field curves and a distortion curve of the image capturing unit according to the 6th embodiment. In FIG. 11A and FIG. 11B, the image capturing unit includes the compact optical system (its reference numeral is omitted) of the present disclosure and an image sensor 660. The compact optical system includes, in order from an object side to an image side, a flat panel 640, a first lens element 610, an aperture stop 600, a second lens element 620, a third lens element 630 and an image surface 650, wherein the compact optical system has a total of three lens elements (610-630) with refractive power. The first lens element 610, the second lens element 620 and the third lens element 630 are all stationary relative to one another in a paraxial region thereof.

The first lens element 610 with negative refractive power has an object-side surface 611 being convex in a paraxial region thereof and an image-side surface 612 being concave in a paraxial region thereof. The first lens element 610 is made of plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material, and has the object-side surface 631 and the image-side surface 632 being both aspheric. The object-side surface 631 of the third lens element 630 has at least one inflection point.

The flat panel 640 is made of glass and located between an imaged object O and the first lens element 610, and will not affect the focal length of the compact optical system. The image sensor 660 is disposed on or near the image surface 650 of the compact optical system.

The detailed optical data of the 6th embodiment are shown in Table 11 and the aspheric surface data are shown in Table 12 below.

TABLE 11

6th Embodiment
f = 0.10 mm, Fno = 2.00, HFOV = 75.1 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Flat Panel | Plano | | 0.737 | Glass | 1.523 | 64.2 | — |
| 2 | | Plano | | 0.507 | | | | |
| 3 | Lens 1 | 42.472 | (ASP) | 0.230 | Plastic | 1.717 | 20.0 | −0.44 |
| 4 | | 0.311 | (ASP) | 1.039 | | | | |
| 5 | Ape. Stop | Plano | | 0.011 | | | | |
| 6 | Lens 2 | 1.523 | (ASP) | 0.369 | Plastic | 1.661 | 23.3 | −2.24 |
| 7 | | 0.679 | (ASP) | 0.020 | | | | |
| 8 | Lens 3 | 0.233 | (ASP) | 0.508 | Plastic | 1.674 | 21.5 | 0.32 |
| 9 | | −0.326 | (ASP) | 0.192 | | | | |
| 10 | Image | Plano | | — | | | | |

Note:
Reference wavelength is 480 nm.

TABLE 12

| Aspheric Coefficients | | | |
|---|---|---|---|
| | Surface # | | |
| | 3 | 4 | 6 |
| k = | −9.9987E−01 | −5.1522E−01 | −7.0741E+01 |
| A4 = | 1.3047E+00 | 8.0055E+00 | 7.8826E−32 |
| A6 = | −2.0646E+00 | −2.3142E+01 | −6.3405E−61 |
| A8 = | 1.7079E+00 | 1.4814E+02 | — |
| A10 = | −6.3998E−01 | −8.1321E+02 | — |
| A12 = | −1.6732E−03 | 7.1988E+03 | — |
| A14 = | 7.6570E−02 | −4.0224E+04 | — |
| A16 = | −1.6643E−02 | 8.0542E+04 | — |
| | Surface # | | |
| | 7 | 8 | 9 |
| k = | −7.3919E+01 | −8.0113E+00 | −5.5724E−01 |
| A4 = | −3.1588E+01 | −1.2590E−03 | 1.0608E+01 |
| A6 = | 7.4251E+02 | −1.1784E+01 | −4.7779E+01 |
| A8 = | −1.3347E+04 | −4.5766E+01 | 1.2667E+02 |
| A10 = | 1.3063E+05 | −1.9406E+02 | — |
| A12 = | −5.2744E+05 | 2.1210E+03 | — |
| A14 = | — | −3.2702E+03 | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.10 | \|f/f1\| + \|f/f2\| + \|f/f3\| | 0.59 |
| Fno | 2.00 | f/ImgH | 0.26 |
| HFOV [deg.] | 75.1 | f/EPD | 2.00 |
| FOV [deg.] | 150.1 | OL/TL | 0.52 |
| V1 + V2 + V3 | 64.8 | OTL [mm] | 3.61 |
| N1 + N2 + N3 | 5.052 | OTL/ΣCT | 3.26 |
| T12/CT1 | 4.56 | OTL/ImgH | 9.40 |
| CTf/CT1 | 3.20 | TD/f | 21.59 |
| (R5 + R6)/(R5 − R6) | −0.17 | \|Dsr3/Dsr5\| | 0.03 |

7th Embodiment

Figure 13A:
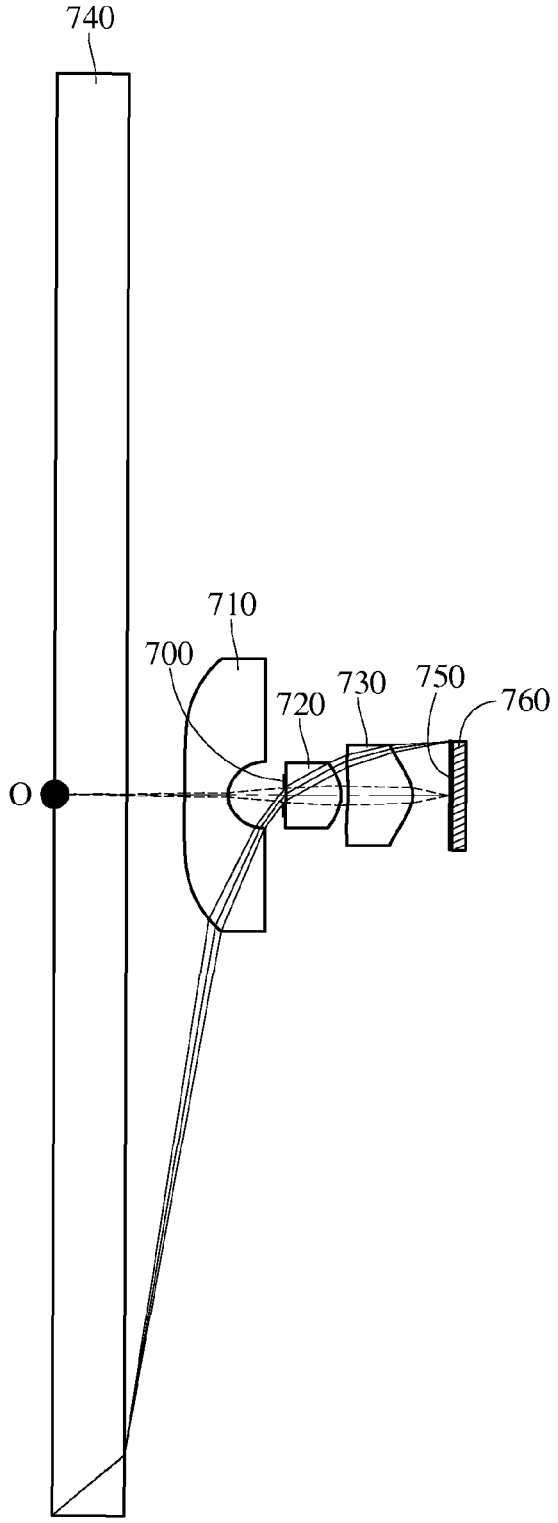
FIG. 13A is a schematic view of an image capturing unit according to the 7th embodiment of the present disclosure.
Figure 13B:
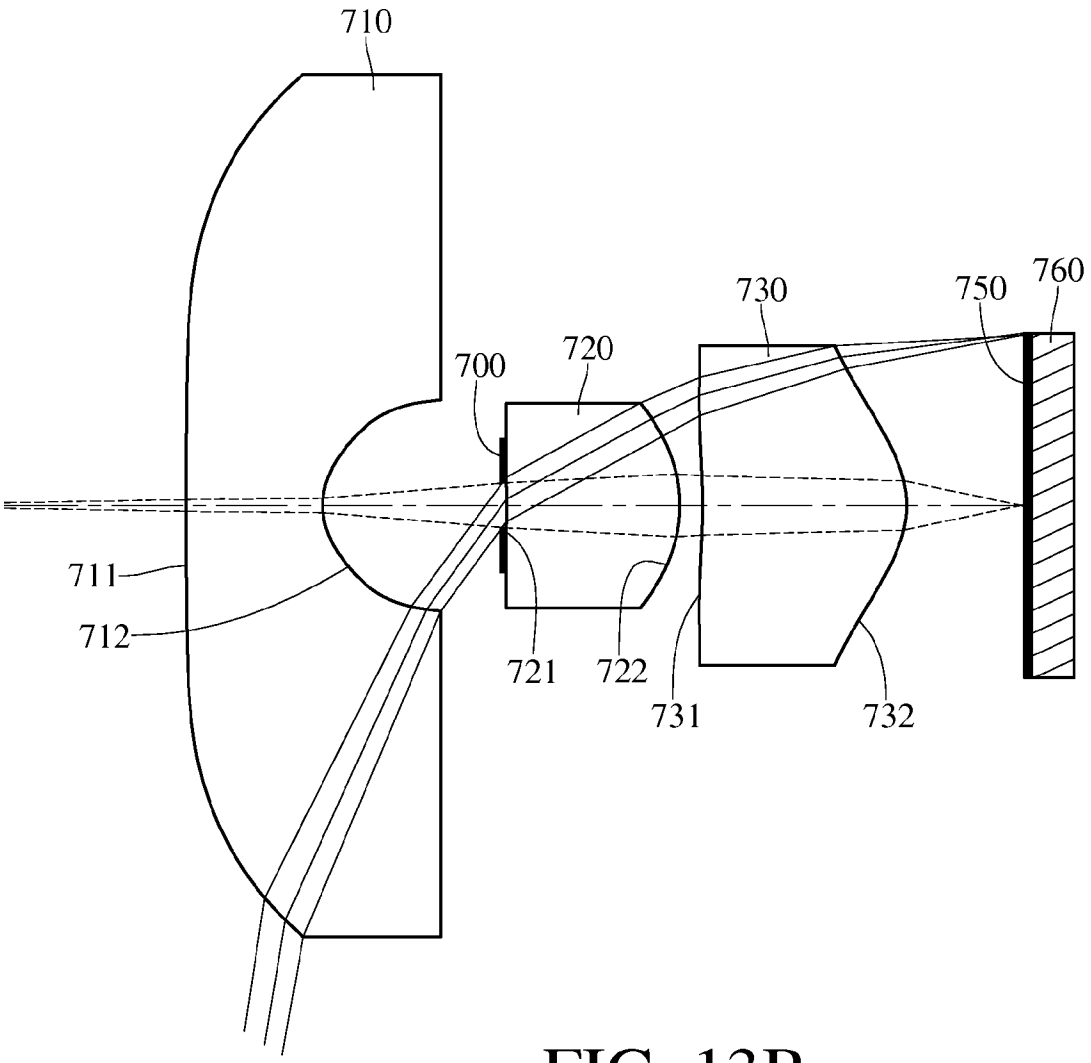
FIG. 13B is a partially enlarged schematic view of the image capturing unit in FIG. 13A.
Figure 14:
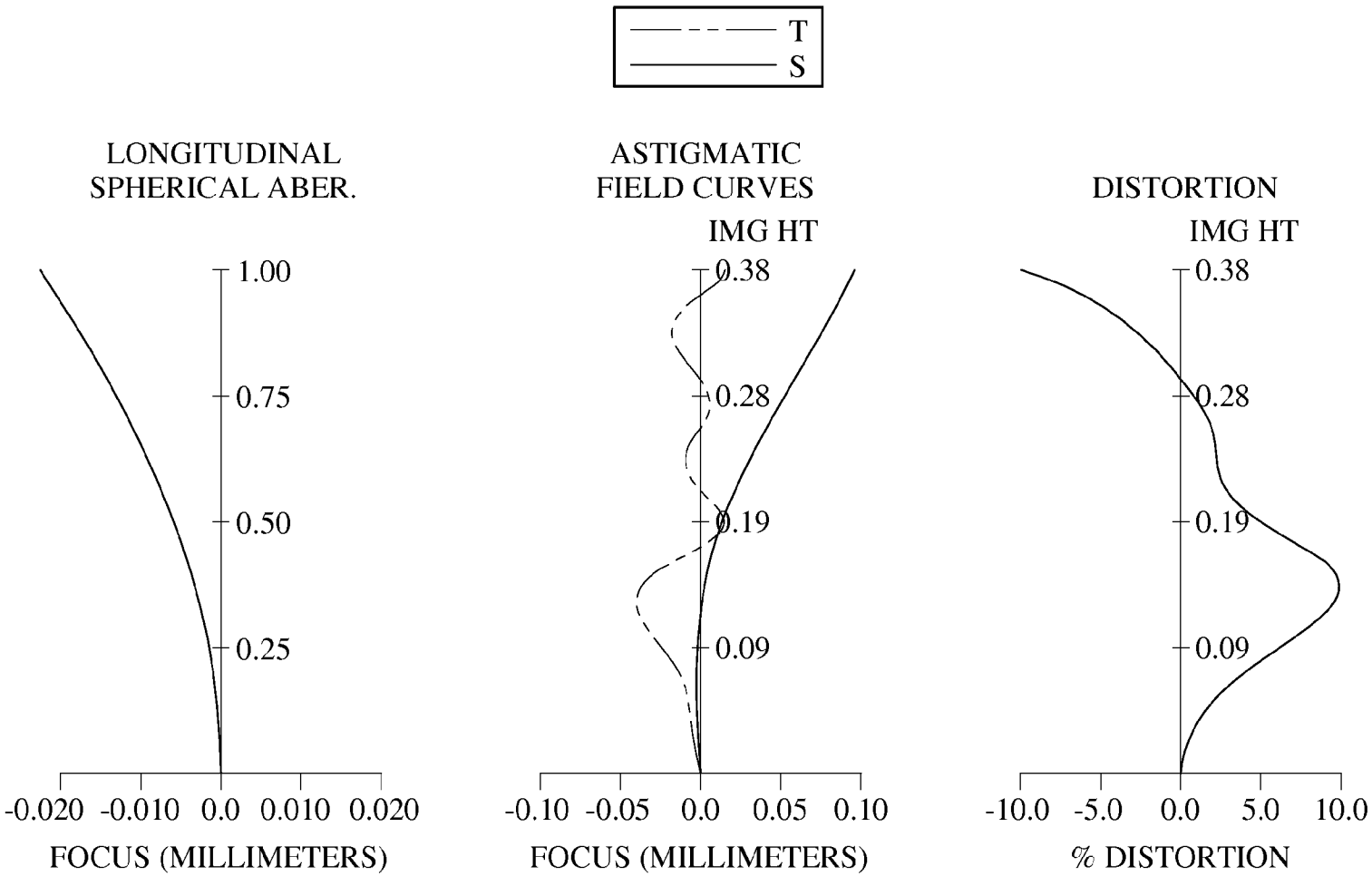
FIG. 14 shows spherical aberration curves, astigmatic field curves and a distortion curve of the image capturing unit according to the 7th embodiment.

FIG. 13A is a schematic view of an image capturing unit according to the 7th embodiment of the present disclosure. FIG. 13B is a partially enlarged schematic view of the image capturing unit in FIG. 13A. FIG. 14 shows spherical aberration curves, astigmatic field curves and a distortion curve of the image capturing unit according to the 7th embodiment. In FIG. 13A and FIG. 13B, the image capturing unit includes the compact optical system (its reference numeral is omitted) of the present disclosure and an image sensor 760. The compact optical system includes, in order from an object side to an image side, a flat panel 740, a first lens element 710, an aperture stop 700, a second lens element 720, a third lens element 730 and an image surface 750, wherein the compact optical system has a total of three lens elements (710-730) with refractive power. The first lens element 710, the second lens element 720 and the third lens element 730 are all stationary relative to one another in a paraxial region thereof.

The first lens element 710 with negative refractive power has an object-side surface 711 being convex in a paraxial region thereof and an image-side surface 712 being concave in a paraxial region thereof. The first lens element 710 is made of plastic material, and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material, and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material, and has the object-side surface 731 and the image-side surface 732 being both aspheric. The object-side surface 731 of the third lens element 730 has at least one inflection point.

The flat panel 740 is made of glass and located between an imaged object O and the first lens element 710, and will not affect the focal length of the compact optical system. The image sensor 760 is disposed on or near the image surface 750 of the compact optical system.

The detailed optical data of the 7th embodiment are shown in Table 13 and the aspheric surface data are shown in Table 14 below.

TABLE 13

| 7th Embodiment<br>f = 0.09 mm, Fno = 2.40, HFOV = 80.5 deg. | | | | | | | |
|---|---|---|---|---|---|---|---|
| Surface # | | Curvature Radius | Thickness | Material | Index | Abbe # | Focal Length |
| 0 | Object | Plano | 0.000 | | | | |
| 1 | Flat Panel | Plano | 0.500 | Glass | 1.523 | 64.2 | — |
| 2 | | Plano | 0.398 | | | | |
| 3 | Lens 1 | 15.000 (ASP) | 0.300 | Plastic | 1.674 | 21.5 | −0.25 |
| 4 | | 0.162 (ASP) | 0.393 | | | | |
| 5 | Ape. Stop | Plano | 0.010 | | | | |
| 6 | Lens 2 | −5.418 (ASP) | 0.380 | Plastic | 1.674 | 21.4 | 0.46 |
| 7 | | −0.301 (ASP) | 0.050 | | | | |

TABLE 13-continued

| 7th Embodiment f = 0.09 mm, Fno = 2.40, HFOV = 80.5 deg. | | | | | | | | |
|---|---|---|---|---|---|---|---|---|
| Surface # | | Curvature Radius | | Thickness | Material | Index | Abbe # | Focal Length |
| 8 | Lens 3 | −1.337 | (ASP) | 0.447 | Plastic | 1.660 | 23.5 | 0.33 |
| 9 | | −0.215 | (ASP) | 0.257 | | | | |
| 10 | Image | Plano | | — | | | | |

Note:
Reference wavelength is 480 nm.

TABLE 14

| Aspheric Coefficients | | | |
|---|---|---|---|
| | Surface # | | |
| | 3 | 4 | 6 |
| k = | −1.0000E+00 | −5.1522E−01 | −3.2825E−14 |
| A4 = | −2.0759E−01 | −1.0338E+01 | 4.5040E+00 |
| A6 = | 1.9664E+00 | 5.9030E+02 | — |
| A8 = | −3.2004E+00 | −6.4492E+04 | — |
| A10 = | 2.4242E+00 | 1.5168E+06 | — |
| A12 = | −6.8958E−01 | −9.9874E+06 | — |
| A14 = | 4.4762E−03 | — | — |
| | Surface # | | |
| | 7 | 8 | 9 |
| k = | −1.4160E+00 | −9.0000E+01 | −7.3530E−01 |
| A4 = | −4.3664E+00 | 2.7081E+00 | 1.8200E+01 |
| A6 = | 6.8533E+01 | −1.1956E+01 | −8.9143E+01 |
| A8 = | −1.4923E+03 | 1.1073E+01 | 5.8239E+02 |
| A10 = | 1.5227E+04 | −1.0257E+01 | −1.0583E+03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.09 | \|f/f1\| + \|f/f2\| + \|f/f3\| | 0.84 |
| Fno | 2.40 | f/ImgH | 0.24 |
| HFOV [deg.] | 80.5 | f/EPD | 2.40 |
| FOV [deg.] | 160.9 | OL/TL | 0.49 |
| V1 + V2 + V3 | 66.4 | OTL [mm] | 2.74 |
| N1 + N2 + N3 | 5.009 | OTL/ΣCT | 2.43 |
| T12/CT1 | 1.34 | OTL/ImgH | 7.25 |
| CTf/CT1 | 1.67 | TD/f | 17.30 |
| (R5 + R6)/(R5 − R6) | 1.38 | \|Dsr3/Dsr5\| | 0.02 |

8th Embodiment

Figure 15A:
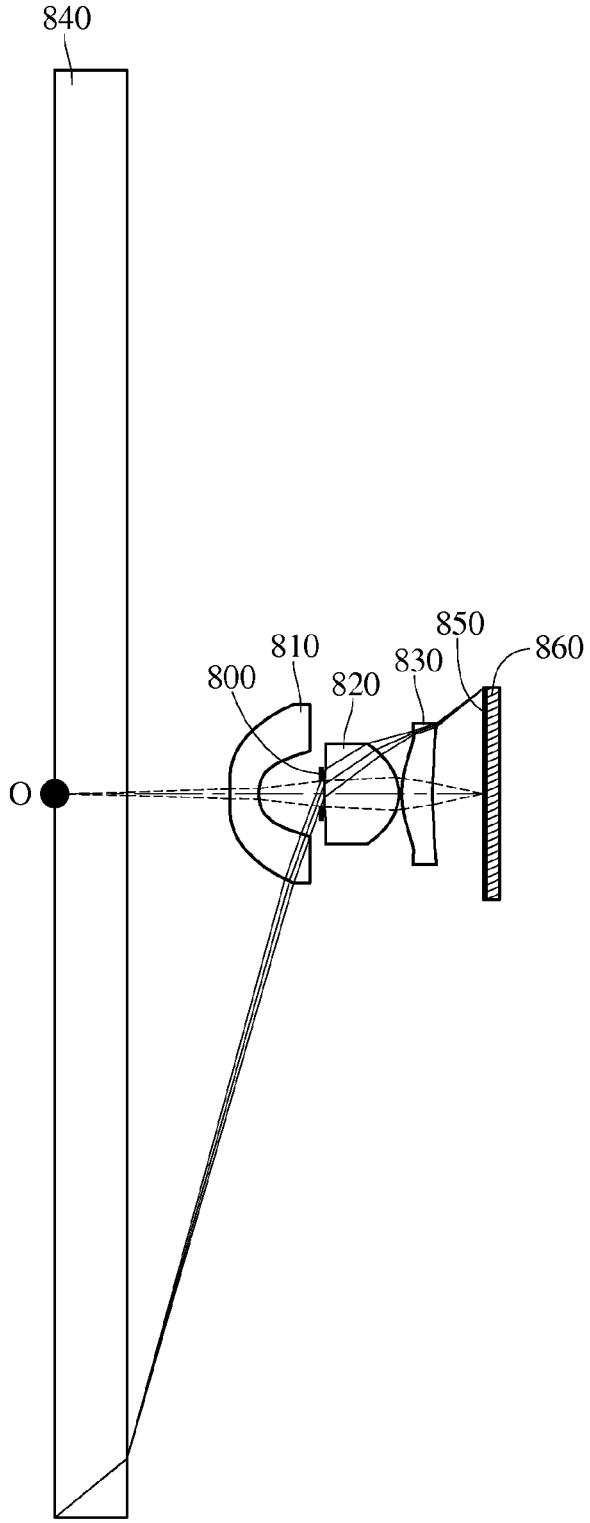
FIG. 15A is a schematic view of an image capturing unit according to the 8th embodiment of the present disclosure.
Figure 15B:
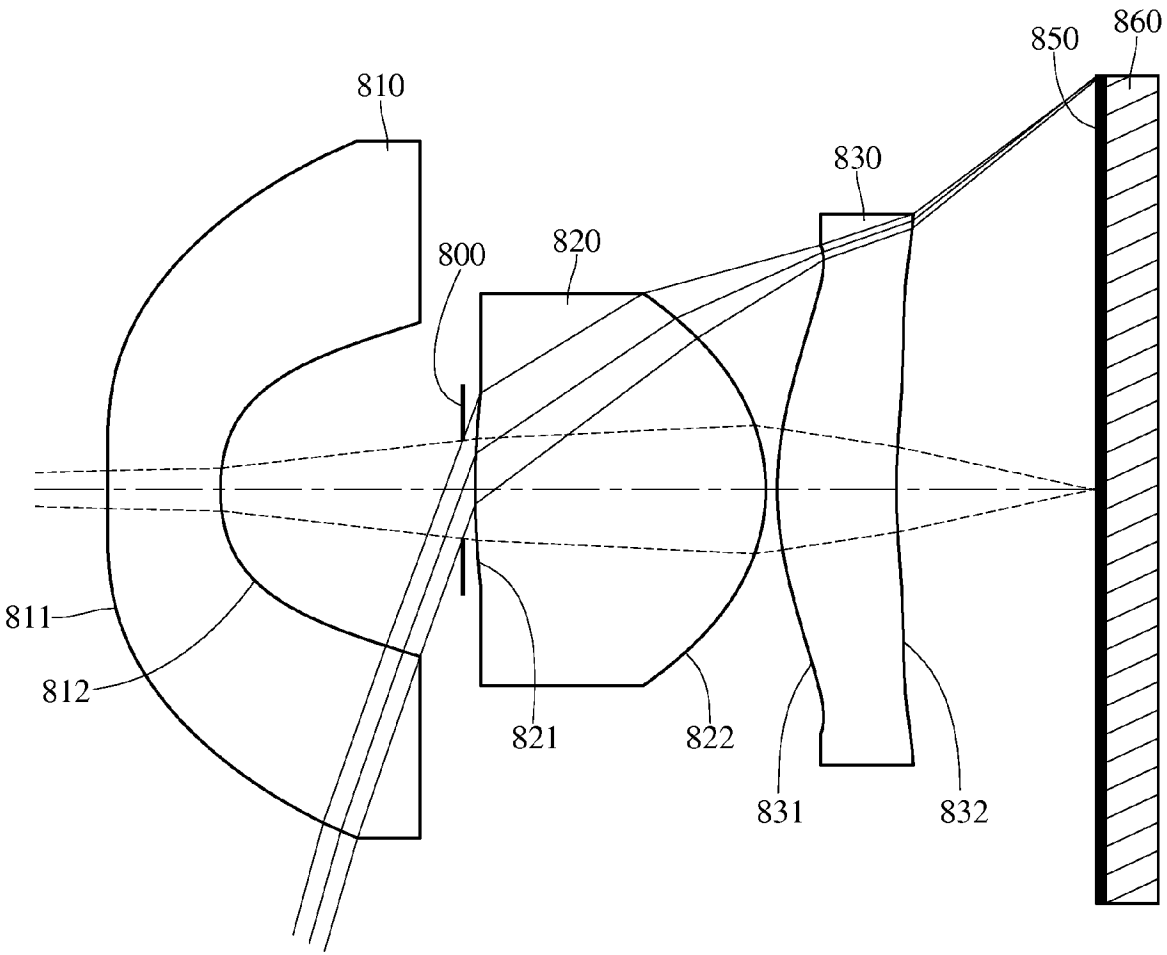
FIG. 15B is a partially enlarged schematic view of the image capturing unit in FIG. 15A.
Figure 16:
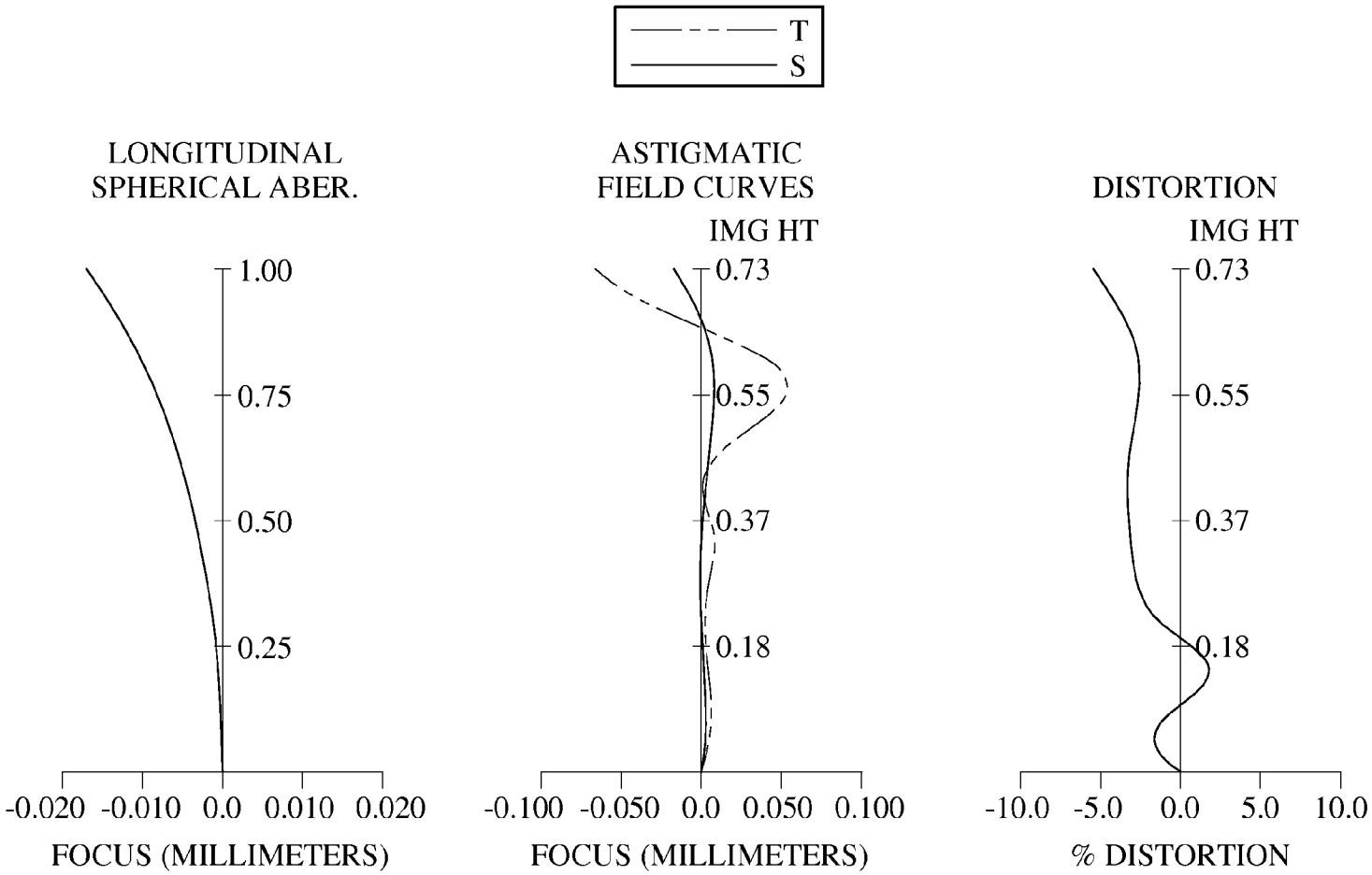
FIG. 16 shows spherical aberration curves, astigmatic field curves and a distortion curve of the image capturing unit according to the 8th embodiment.

FIG. 15A is a schematic view of an image capturing unit according to the 8th embodiment of the present disclosure. FIG. 15B is a partially enlarged schematic view of the image capturing unit in FIG. 15A. FIG. 16 shows spherical aberration curves, astigmatic field curves and a distortion curve of the image capturing unit according to the 8th embodiment. In FIG. 15A and FIG. 15B, the image capturing unit includes the compact optical system (its reference numeral is omitted) of the present disclosure and an image sensor 860. The compact optical system includes, in order from an object side to an image side, a flat panel 840, a first lens element 810, an aperture stop 800, a second lens element 820, a third lens element 830 and an image surface 850, wherein the compact optical system has a total of three lens elements (810-830) with refractive power. The first lens element 810, the second lens element 820 and the third lens element 830 are all stationary relative to one another in a paraxial region thereof.

The first lens element 810 with negative refractive power has an object-side surface 811 being concave in a paraxial region thereof and an image-side surface 812 being concave in a paraxial region thereof. The first lens element 810 is made of plastic material, and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of plastic material, and has the object-side surface 821 and the image-side surface 822 being both aspheric.

The third lens element 830 with positive refractive power has an object-side surface 831 being convex in a paraxial region thereof and an image-side surface 832 being concave in a paraxial region thereof. The third lens element 830 is made of plastic material, and has the object-side surface 831 and the image-side surface 832 being both aspheric. The object-side surface 831 and the image-side surface 832 of the third lens element 830 have at least one inflection point.

The flat panel 840 is made of glass and located between an imaged object O and the first lens element 810, and will not affect the focal length of the compact optical system. The image sensor 860 is disposed on or near the image surface 850 of the compact optical system.

The detailed optical data of the 8th embodiment are shown in Table 15 and the aspheric surface data are shown in Table 16 below.

TABLE 15

| 8th Embodiment<br>f = 0.21 mm, Fno = 2.40, HFOV = 74.3 deg. | | | | | | | |
|---|---|---|---|---|---|---|---|
| Surface # | | Curvature Radius | Thickness | Material | Index | Abbe # | Focal Length |
| 0 | Object | Plano | 0.000 | | | | |
| 1 | Flat Panel | Plano | 0.500 | Glass | 1.523 | 64.2 | — |
| 2 | | Plano | 0.708 | | | | |
| 3 | Lens 1 | −8.835 (ASP) | 0.200 | Plastic | 1.660 | 23.5 | −0.49 |
| 4 | | 0.338 (ASP) | 0.429 | | | | |
| 5 | Ape. Stop | Plano | 0.022 | | | | |
| 6 | Lens 2 | 1.428 (ASP) | 0.515 | Plastic | 1.598 | 30.2 | 0.50 |
| 7 | | −0.324 (ASP) | 0.020 | | | | |
| 8 | Lens 3 | 0.589 (ASP) | 0.211 | Plastic | 1.660 | 23.5 | 1.62 |
| 9 | | 1.126 (ASP) | 0.355 | | | | |
| 10 | Image | Plano | — | | | | |

Note:
Reference wavelength is 480 nm.

TABLE 16

| Aspheric Coefficients | | | |
|---|---|---|---|
| | Surface # | | |
| | 3 | 4 | 6 |
| k = | −9.9992E−01 | −5.1522E−01 | 1.7181E+01 |
| A4 = | 1.1491E+01 | 3.6278E+01 | −1.6594E+00 |
| A6 = | −7.3638E+01 | −3.0095E+02 | −7.3073E+00 |
| A8 = | 2.8193E+02 | 4.0905E+03 | — |
| A10 = | −3.8213E+02 | 1.6377E+04 | — |
| A12 = | −9.1428E+02 | −7.4275E+05 | — |
| A14 = | 3.7522E+03 | 4.2082E+06 | — |
| A16 = | −3.5581E+03 | −6.7616E+06 | — |
| | Surface # | | |
| | 7 | 8 | 9 |
| k = | −6.7877E−01 | 4.3772E−01 | 3.0043E+00 |
| A4 = | 1.9698E−01 | −2.2897E+00 | −5.3307E+00 |
| A6 = | −1.7633E+01 | −2.8553E+01 | −4.1074E−01 |
| A8 = | −7.0664E+01 | 3.2916E+02 | 3.9246E+02 |
| A10 = | 2.6099E+03 | −1.5627E+03 | −2.6874E+03 |
| A12 = | −1.0959E+04 | 2.5641E+03 | 6.9987E+03 |
| A14 = | — | −3.3699E+03 | −6.5280E+03 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.21 | \|f/f1\| + \|f/f2\| + \|f/f3\| | 1.00 |
| Fno | 2.40 | f/ImgH | 0.29 |
| HFOV [deg.] | 74.3 | f/EPD | 2.40 |
| FOV [deg.] | 148.6 | OL/TL | 0.69 |
| V1 + V2 + V3 | 77.2 | OTL [mm] | 2.96 |
| N1 + N2 + N3 | 4.919 | OTL/ΣCT | 3.20 |
| T12/CT1 | 2.26 | OTL/ImgH | 4.05 |
| CTf/CT1 | 2.50 | TD/f | 6.57 |
| (R5 + R6)/(R5 − R6) | −3.19 | \|Dsr3/Dsr5\| | 0.04 |

9th Embodiment

Figure 17A:
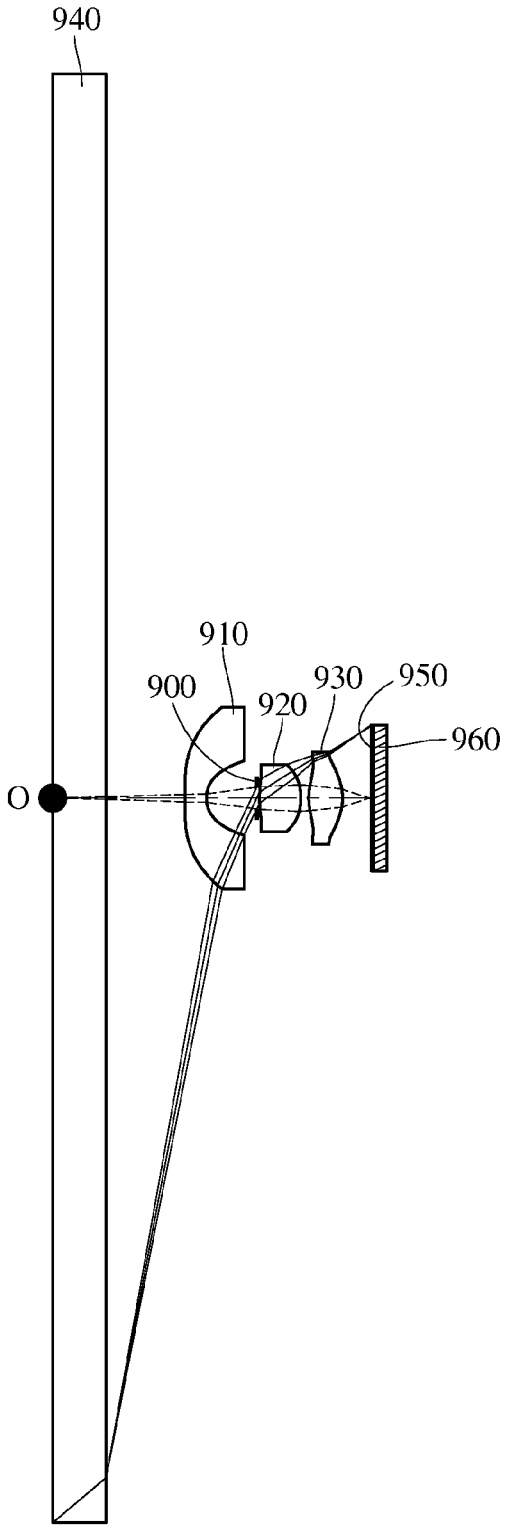
FIG. 17A is a schematic view of an image capturing unit according to the 9th embodiment of the present disclosure.
Figure 17B:
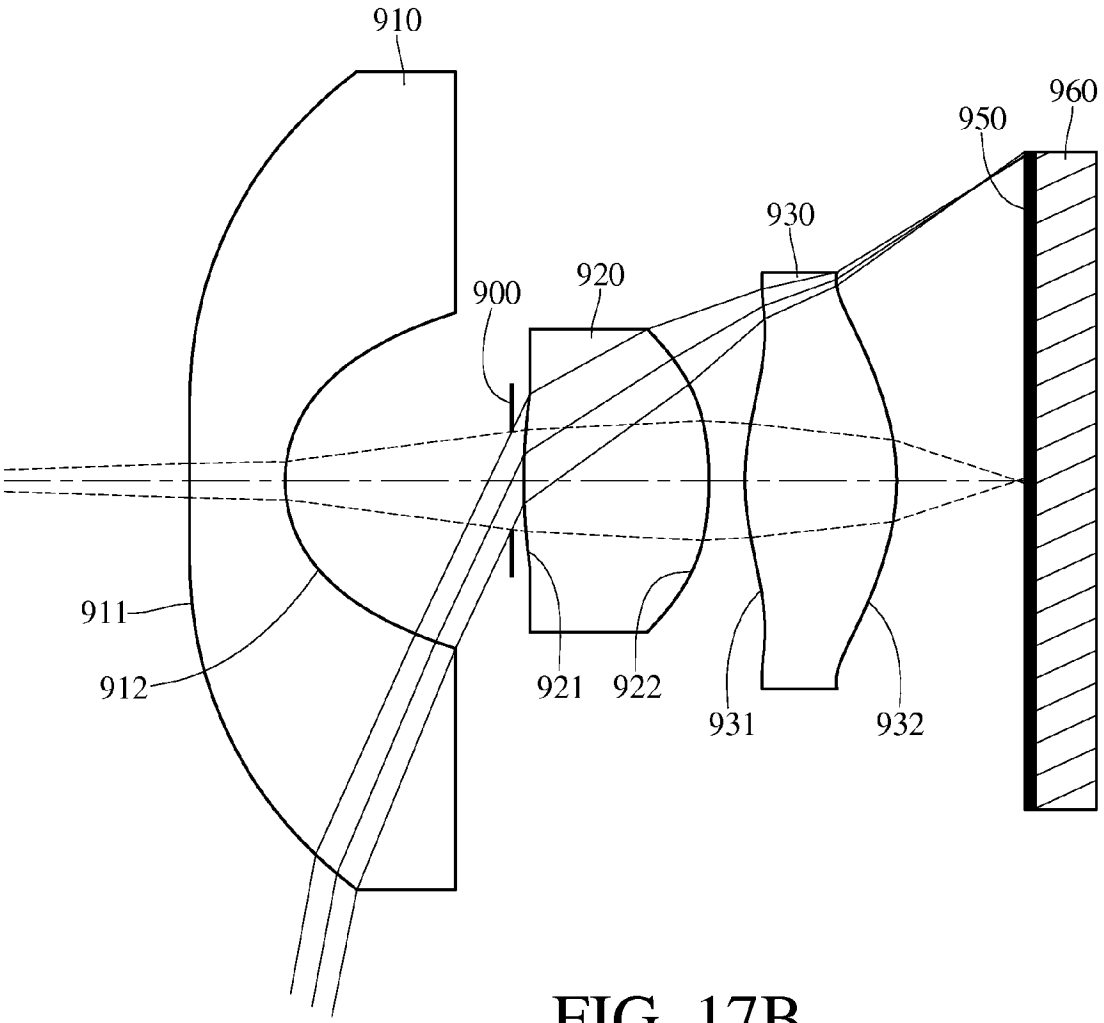
FIG. 17B is a partially enlarged schematic view of the image capturing unit in FIG. 17A.
Figure 18:
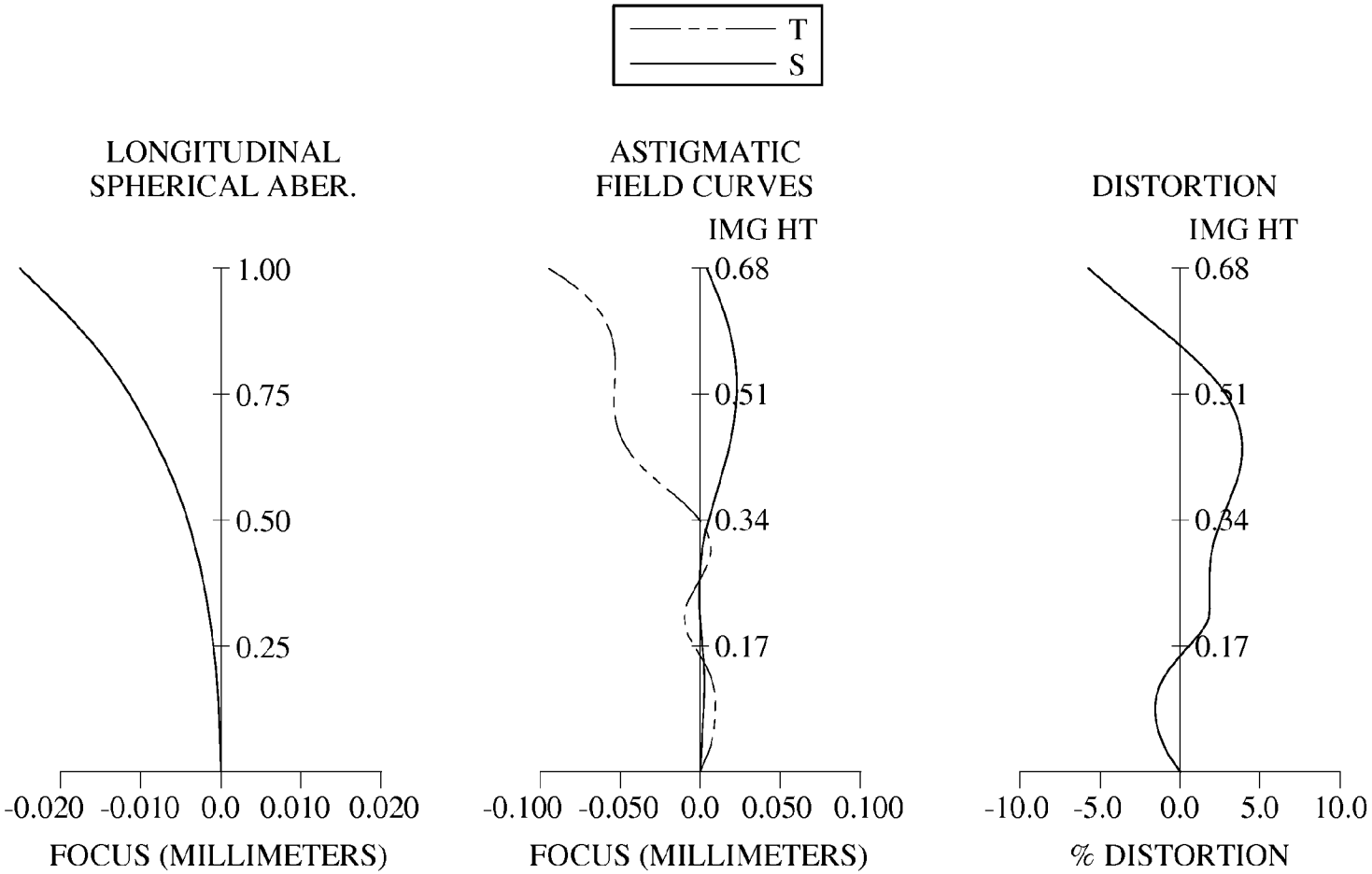
FIG. 18 shows spherical aberration curves, astigmatic field curves and a distortion curve of the image capturing unit according to the 9th embodiment.

FIG. 17A is a schematic view of an image capturing unit according to the 9th embodiment of the present disclosure. FIG. 17B is a partially enlarged schematic view of the image capturing unit in FIG. 17A. FIG. 18 shows spherical aberration curves, astigmatic field curves and a distortion curve of the image capturing unit according to the 9th embodiment. In FIG. 17A and FIG. 17B, the image capturing unit includes the compact optical system (its reference numeral is omitted) of the present disclosure and an image sensor 960. The compact optical system includes, in order from an object side to an image side, a flat panel 940, a first lens element 910, an aperture stop 900, a second lens element 920, a third lens element 930 and an image surface 950, wherein the compact optical system has a total of three lens elements (910-930) with refractive power. The first lens element 910, the second lens element 920 and the third lens element 930 are all stationary relative to one another in a paraxial region thereof.

The first lens element 910 with negative refractive power has an object-side surface 911 being concave in a paraxial region thereof and an image-side surface 912 being concave in a paraxial region thereof. The first lens element 910 is made of plastic material, and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material, and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material, and has the object-side surface 931 and the image-side surface 932 being both aspheric. The object-side surface 931 and the image-side surface 932 of the third lens element 930 have at least one inflection point.

The flat panel 940 is made of glass and located between an imaged object O and the first lens element 910, and will not affect the focal length of the compact optical system. The image sensor 960 is disposed on or near the image surface 950 of the compact optical system.

The detailed optical data of the 9th embodiment are shown in Table 17 and the aspheric surface data are shown in Table 18 below.

TABLE 17

| 9th Embodiment<br>f = 0.15 mm, Fno = 1.60, HFOV = 79.3 deg. | | | | | | | |
|---|---|---|---|---|---|---|---|
| Surface # | | Curvature Radius | Thickness | Material | Index | Abbe # | Focal Length |
| 0 | Object | Plano | 0.000 | | | | |
| 1 | Flat Panel | Plano | 0.500 | Glass | 1.523 | 64.2 | — |
| 2 | | Plano | 0.739 | | | | |
| 3 | Lens 1 | −16.036 (ASP) | 0.200 | Plastic | 1.674 | 21.5 | −0.42 |
| 4 | | 0.287 (ASP) | 0.473 | | | | |
| 5 | Ape. Stop | Plano | 0.025 | | | | |
| 6 | Lens 2 | 1.260 (ASP) | 0.386 | Plastic | 1.598 | 30.2 | 0.85 |
| 7 | | −0.750 (ASP) | 0.075 | | | | |
| 8 | Lens 3 | 0.493 (ASP) | 0.317 | Plastic | 1.674 | 21.5 | 0.41 |
| 9 | | −0.458 (ASP) | 0.267 | | | | |
| 10 | Image | Plano | — | | | | |

Note:
Reference wavelength is 480 nm.

TABLE 18

| Aspheric Coefficients | | | |
|---|---|---|---|
| | Surface # | | |
| | 3 | 4 | 6 |
| k = | −9.9986E−01 | −5.1522E−01 | 3.4814E+00 |
| A4 = | 2.1555E+00 | 6.0675E+00 | −7.2076E−01 |
| A6 = | −5.5319E+00 | −1.5280E+01 | — |
| A8 = | 8.5214E+00 | 6.3044E+01 | — |
| A10 = | −5.9901E+00 | 7.6621E+01 | — |
| A12 = | 6.2520E−01 | −1.0549E+03 | — |
| A14 = | 1.2884E+00 | 1.8143E+03 | — |
| A16 = | −4.6567E−01 | −8.8491E+02 | — |
| | Surface # | | |
| | 7 | 8 | 9 |
| k = | 1.4447E+00 | −3.7783E−01 | −2.5927E−01 |
| A4 = | −9.9434E+00 | −1.0543E+01 | 5.0921E+00 |
| A6 = | 4.9153E+01 | 9.6135E+01 | −3.2901E+01 |
| A8 = | 2.7144E+00 | −1.0514E+03 | 1.3855E+02 |
| A10 = | −3.7730E+02 | 6.2546E+03 | — |
| A12 = | 5.0995E+02 | −1.6837E+04 | — |
| A14 = | — | 1.6440E+04 | — |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 0.15 | \|f/f1\| + \|f/f2\| + \|f/f3\| | 0.92 |
| Fno | 1.60 | f/ImgH | 0.22 |
| HFOV [deg.] | 79.3 | f/EPD | 1.60 |
| FOV [deg.] | 158.7 | OL/TL | 0.71 |
| V1 + V2 + V3 | 73.2 | OTL [mm] | 2.98 |
| N1 + N2 + N3 | 4.947 | OTL/ΣCT | 3.30 |
| T12/CT1 | 2.49 | OTL/ImgH | 4.39 |
| CTf/CT1 | 2.50 | TD/f | 9.70 |
| (R5 + R6)/(R5 − R6) | 0.04 | \|Dsr3/Dsr5\| | 0.05 |

10th Embodiment

Figure 19A:
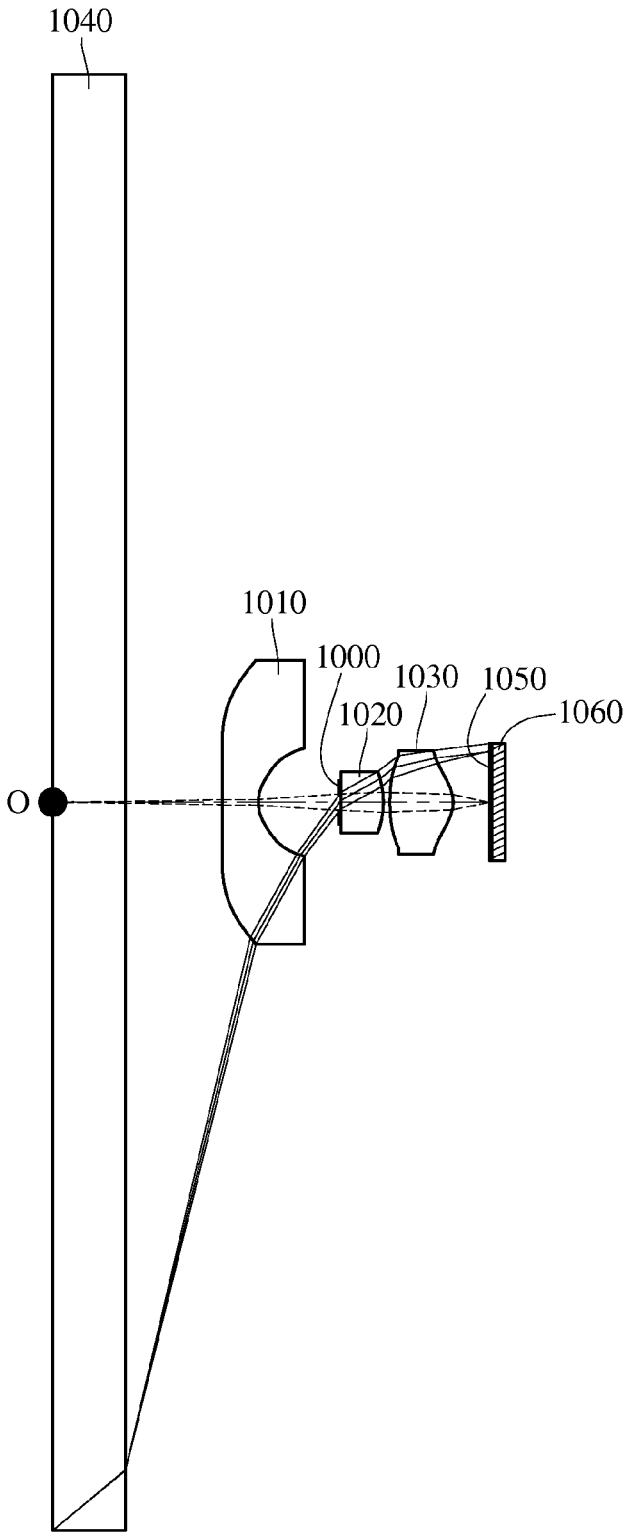
FIG. 19A is a schematic view of an image capturing unit according to the 10th embodiment of the present disclosure.
Figure 19B:
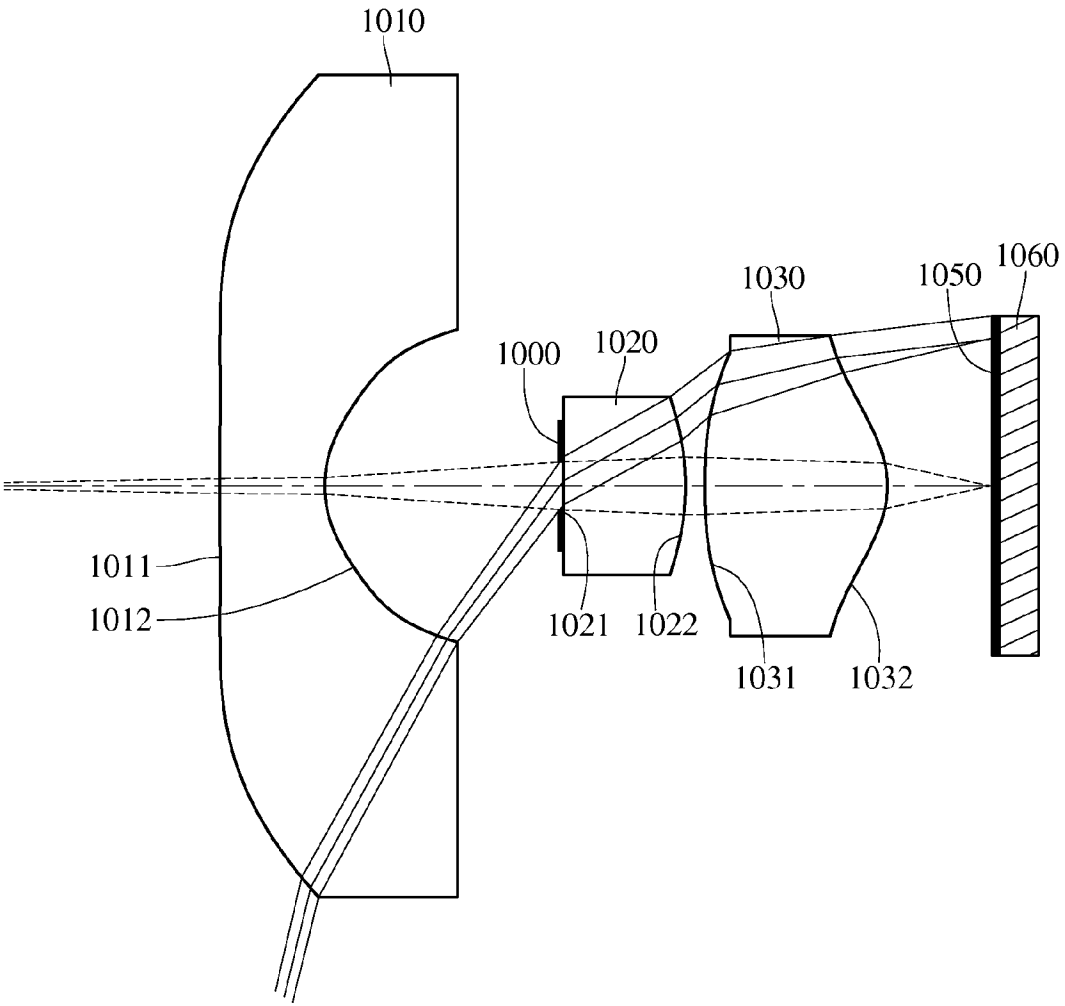
FIG. 19B is a partially enlarged schematic view of the image capturing unit in FIG. 19A.
Figure 20:
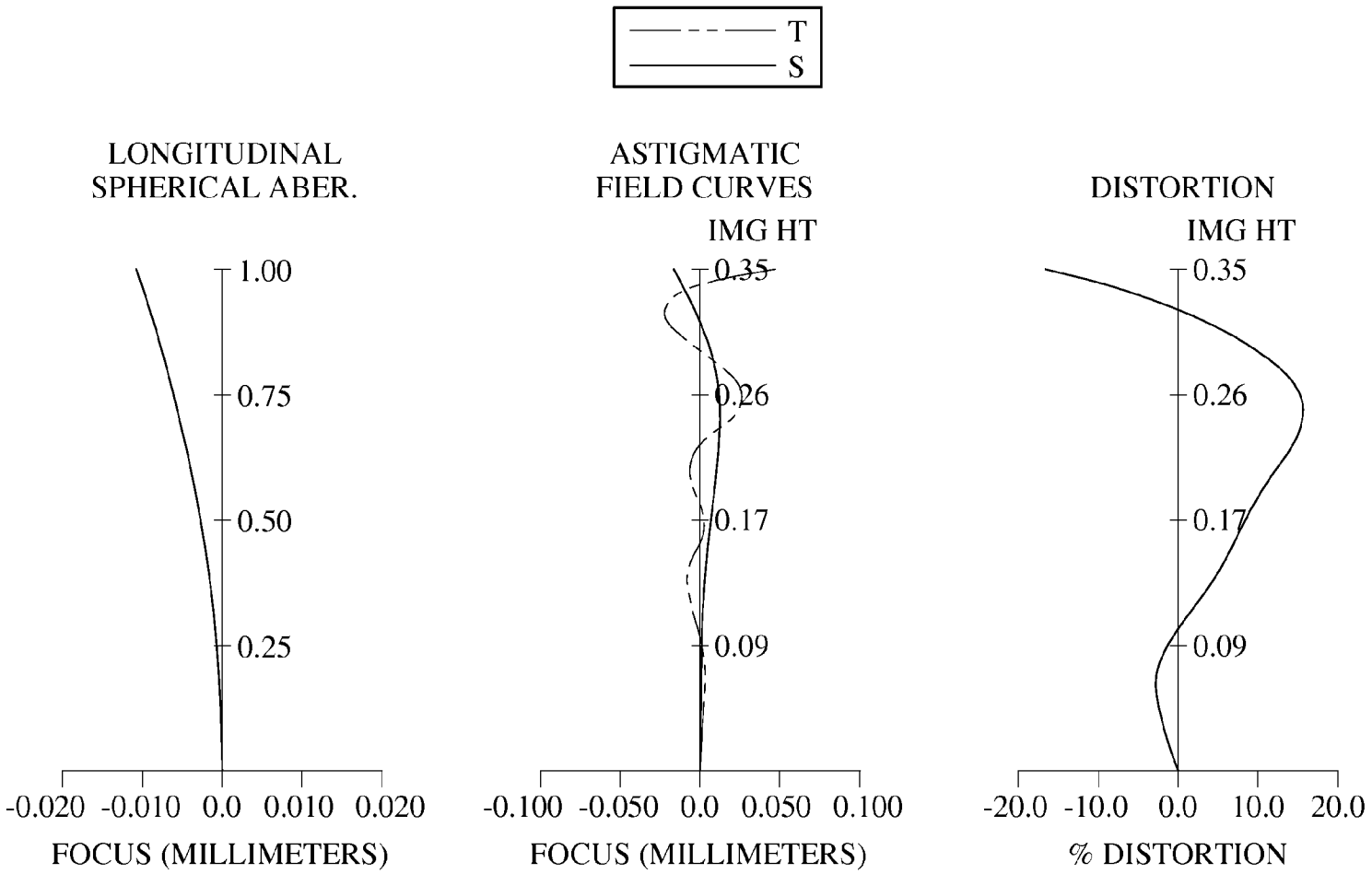
FIG. 20 shows spherical aberration curves, astigmatic field curves and a distortion curve of the image capturing unit according to the 10th embodiment.

FIG. 19A is a schematic view of an image capturing unit according to the 10th embodiment of the present disclosure. FIG. 19B is a partially enlarged schematic view of the image capturing unit in FIG. 19A. FIG. 20 shows spherical aberration curves, astigmatic field curves and a distortion curve of the image capturing unit according to the 10th embodiment. In FIG. 19A and FIG. 19B, the image capturing unit includes the compact optical system (its reference numeral is omitted) of the present disclosure and an image sensor 1060. The compact optical system includes, in order from an object side to an image side, a flat panel 1040, a first lens element 1010, an aperture stop 1000, a second lens element 1020, a third lens element 1030 and an image surface 1050, wherein the compact optical system has a total of three lens elements (1010-1030) with refractive power. The first lens element 1010, the second lens element 1020 and the third lens element 1030 are all stationary relative to one another in a paraxial region thereof.

The first lens element 1010 with negative refractive power has an object-side surface 1011 being convex in a paraxial region thereof and an image-side surface 1012 being concave in a paraxial region thereof. The first lens element 1010 is made of plastic material, and has the object-side surface 1011 and the image-side surface 1012 being both aspheric.

The second lens element 1020 with positive refractive power has an object-side surface 1021 being flat in a paraxial region thereof and an image-side surface 1022 being convex in a paraxial region thereof The second lens element 1020 is made of plastic material, and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of plastic material, and has the object-side surface 1031 and the image-side surface 1032 being both aspheric. The image-side surface 1032 of the third lens element 1030 has at least one inflection point.

The flat panel 1040 is made of glass and located between an imaged object O and the first lens element 1010, and will not affect the focal length of the compact optical system. The image sensor 1060 is disposed on or near the image surface 1050 of the compact optical system.

The detailed optical data of the 10th embodiment are shown in Table 19 and the aspheric surface data are shown in Table 20 below.

TABLE 19

| 10th Embodiment<br>f = 0.12 mm, Fno = 2.40, HFOV = 76.4 deg. | | | | | | | |
|---|---|---|---|---|---|---|---|
| Surface # | | Curvature Radius | Thickness | Material | Index | Abbe # | Focal Length |
| 0 | Object | Plano | 0.000 | | | | |
| 1 | Flat Panel | Plano | 0.500 | Glass | 1.523 | 64.2 | — |
| 2 | | Plano | 0.661 | | | | |
| 3 | Lens 1 | 15.000 (ASP) | 0.249 | Plastic | 1.674 | 21.5 | −0.42 |
| 4 | | 0.276 (ASP) | 0.558 | | | | |
| 5 | Ape. Stop | Plano | 0.009 | | | | |
| 6 | Lens 2 | Plano | 0.290 | Plastic | 1.660 | 23.5 | 0.80 |
| 7 | | −0.531 (ASP) | 0.045 | | | | |
| 8 | Lens 3 | 1.324 (ASP) | 0.434 | Plastic | 1.660 | 23.5 | 0.33 |
| 9 | | −0.226 (ASP) | 0.249 | | | | |
| 10 | Image | Plano | — | | | | |

Note:
Reference wavelength is 480 nm.

TABLE 20

| Aspheric Coefficients | | | |
|---|---|---|---|
| | Surface # | | |
| | 3 | 4 | 7 |
| k = | −1.0000E+00 | −5.1522E−01 | −1.0629E+01 |
| A4 = | −5.5241E−01 | 8.2831E+00 | −5.1546E+00 |
| A6 = | 3.0468E+00 | −4.4169E+02 | 1.8667E+02 |
| A8 = | −4.6870E+00 | 5.1872E+03 | −5.1532E+03 |
| A10 = | 3.3702E+00 | −2.3830E+04 | 5.0028E+04 |
| A12 = | −9.5570E−01 | 3.7594E+04 | — |
| A14 = | 2.0562E−03 | | — |

| | Surface # | |
|---|---|---|
| | 8 | 9 |
| k = | −4.5453E+01 | −7.3057E−01 |
| A4 = | 5.7245E+00 | 1.5752E+01 |
| A6 = | −2.7525E+01 | −1.6147E+01 |
| A8 = | 3.7878E+01 | −1.6867E+02 |
| A10 = | −2.6500E+01 | 1.3324E+03 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 0.12 | \|f/f1\| + \|f/f2\| + \|f/f3\| | 0.78 |
| Fno | 2.40 | f/ImgH | 0.34 |
| HFOV [deg.] | 76.4 | f/EPD | 2.40 |
| FOV [deg.] | 152.9 | OL/TL | 0.63 |
| V1 + V2 + V3 | 68.5 | OTL [mm] | 3.00 |
| N1 + N2 + N3 | 4.995 | OTL/ΣCT | 3.08 |
| T12/CT1 | 2.28 | OTL/ImgH | 8.61 |
| CTf/CT1 | 2.01 | TD/f | 13.47 |
| (R5 + R6)/(R5 − R6) | 0.71 | \|Dsr3/Dsr5\| | 0.03 |

The foregoing image capturing unit is able to be installed in, but not limited to, an electronic device, including smart phones, tablet personal computers, wearable apparatus and driving assist devices. According to the present disclosure, the compact optical system has a total of three lens elements with refractive power. In order to satisfy the requirements of compact size and wide field of view when the imaged object is extremely close to the compact optical system, the first lens element has negative refractive power, and the third lens element has positive refractive power. Therefore, it is favorable for providing the compact optical system with retrofocus performance so as to reduce the chief ray angle of the compact optical system, thereby providing the compact optical system with enhanced telecentric performance. Furthermore, when specific conditions are satisfied, it is favorable for collecting the light with large incident angle so as to allow the compact optical system to capture a wide field of view and recognize an imaged object while the distance between the imaged object and the compact optical system is extremely close. Moreover, it is favorable for reducing a required distance for imaging capturing between the imaged object and the compact optical system so as to keep the compact optical system compact.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

[1. A compact optical system comprising, in order from an object side to an image side:

a first lens element with negative refractive power having an image-side surface being concave in a paraxial region thereof;

a second lens element, wherein at least one of an object-side surface and an image-side surface of the second lens element is aspheric, and the second lens element is made of plastic material; and a third lens element having positive refractive power, wherein at least one of an object-side surface and an image-side surface of the third lens element is aspheric, and the third lens element is made of plastic material;

wherein the compact optical system has a total of three lens elements, the compact optical system further comprises an aperture stop located between the first lens element and the second lens element, the first lens element, the second lens element and the third lens element are all stationary relative to one another in a paraxial region thereof;

wherein a focal length of the compact optical system is f, a maximum image height of the compact optical system is ImgH, an entrance pupil diameter of the compact optical system is EPD, a refractive index of the first lens element is N1, a refractive index of the second lens element is N2, a refractive index of the third lens element is N3, an axial distance between the aperture stop and the object-side surface of the second lens element is Dsr3, an axial distance between the aperture stop and the object-side surface of the third lens element is Dsr5, and the following conditions are satisfied:

$$f/ImgH<0.55;$$

$$f/EPD<2.60;$$

$$4.70<N1+N2+N3<5.50; \text{ and}$$

$$0<|Dsr3/Dsr5|<0.50.$$ ]

[2. The compact optical system of claim 1, wherein the image-side surface of the third lens element is convex in a paraxial region thereof.]

[3. The compact optical system of claim 2, wherein the second lens element has positive refractive power, and the image-side surface of the second lens element is convex in a paraxial region thereof.]

[4. The compact optical system of claim 2, wherein a curvature radius of the object-side surface of the third lens element is R5, a curvature radius of the image-side surface of the third lens element is R6, and the following condition is satisfied:

$$-0.50<(R5+R6)/(R5-R6)<0.50.$$ ]

[5. The compact optical system of claim 1, wherein at least one of the object-side surface and the image-side surface of the third lens element has at least one inflection point, a curvature radius of the object-side surface of the third lens element is R5, a curvature radius of the image-side surface of the third lens element is R6, and the following condition is satisfied:

$$(R5+R6)/(R5-R6)<0.90.$$ ]

[6. The compact optical system of claim 1, wherein an axial distance between an imaged object and an image surface is OTL, and the following condition is satisfied:

OTL<8.0 millimeters (mm).]

[7. The compact optical system of claim 1, wherein the focal length of the compact optical system is f, the maximum image height of the compact optical system is ImgH, and the following condition is satisfied:

$$f/ImgH<0.45.$$ ]

[8. The compact optical system of claim 1, wherein an Abbe number of the first lens element is V1, an Abbe number of the second lens element is V2, an Abbe number of the third lens element is V3, and the following condition is satisfied:

$$V1+V2+V3<80.$$ ]

[9. The compact optical system of claim 1, further comprising a flat panel, wherein the flat panel is located between an imaged object and an object-side surface of the first lens element.]

[10. An image capturing unit, comprising:

the compact optical system of claim 1; and an image sensor, wherein the image sensor is disposed on the image side of the compact optical system.]

[11. An electronic device comprising:

a biometric system, wherein the biometric system comprises the image capturing unit of claim 10.]

[12. A compact optical system comprising, in order from an object side to an image side:

a first lens element with negative refractive power having an image-side surface being concave in a paraxial region thereof;

a second lens element, wherein at least one of an object-side surface and an image-side surface of the second lens element is aspheric, and the second lens element is made of plastic material; and a third lens element having positive refractive power, wherein at least one of an object-side surface and an image-side surface of the third lens element is aspheric, and the third lens element is made of plastic material;

wherein the compact optical system has a total of three lens elements, the compact optical system further comprises an aperture stop located between the first lens element and the second lens element, the first lens element, the second lens element and the third lens element are all stationary relative to one another in a paraxial region thereof;

wherein a focal length of the compact optical system is f, a focal length of the first lens element is f1, a focal length of the second lens element is f2, a focal length of the third lens element is f3, a maximum image height of the compact optical system is ImgH, a refractive index of the first lens element is N1, a refractive index of the second lens element is N2, a refractive index of the third lens element is N3, an axial distance between the aperture stop and the object-side surface of the second lens element is Dsr3, an axial distance between the aperture stop and the object-side surface of the third lens element is Dsr5, an axial distance between an imaged object and an image surface is OTL, a sum of central thicknesses of the first lens element, the second lens element and the third lens element is ΣCT, and the following conditions are satisfied:

$$0.5<|f/f1|+|f/f2|+|f/f3|<1.1;$$

$$f/ImgH<0.70;$$

$$4.70<N1+N2+N3<5.50;$$

$$0<|Dsr3/Dsr5|<0.50; \text{ and}$$

$$OTL/\Sigma CT<4.0.$$ ]

[13. The compact optical system of claim 12, wherein the image-side surface of the third lens element is convex in a paraxial region thereof.]

[14. The compact optical system of claim 12, wherein the axial distance between the imaged object and the image surface is OTL, the maximum image height of the compact optical system is ImgH, and the following condition is satisfied:

$$OTL/ImgH<12.$$ ]

[15. The compact optical system of claim 14, wherein a maximal field of view of the compact optical system is FOV, and the following condition is satisfied:

140.0 degrees (deg.)<FOV<180.0 deg. ]

[16. The compact optical system of claim 14, wherein the compact optical system further comprises a flat panel located between the imaged object and an object-side surface of the first lens element, a central thickness of the flat panel is CTf, a central thickness of the first lens element is CT1, and the following condition is satisfied:

0.95<CTf/CT1<5.5. ]

[17. The compact optical system of claim 12, wherein at least one of the object-side surface and the image-side surface of the third lens element has at least one inflection point, the axial distance between the imaged object and the image surface is OTL, and the following condition is satisfied:

OTL<5.0 mm. ]

[18. The compact optical system of claim 12, wherein a curvature radius of the object-side surface of the third lens element is R5, a curvature radius of the image-side surface of the third lens element is R6, and the following condition is satisfied:

(R5+R6)/(R5−R6)<0.90. ]

[19. The compact optical system of claim 12, wherein an axial distance between the first lens element and the second lens element is T12, a central thickness of the first lens element is CT1, and the following condition is satisfied:

1.50<T12/CT1<10. ]

[20. The compact optical system of claim 12, wherein an axial distance between the imaged object and an object-side surface of the first lens element is OL, an axial distance between the object-side surface of the first lens element and the image surface is TL, and the following condition is satisfied:

0<OL/TL<1.0. ]

[21. The compact optical system of claim 12, wherein an axial distance between the object-side surface of the first lens element and the image-side surface of the third lens element is TD, the focal length of the compact optical system is f, and the following condition is satisfied:

8<TD/f<30. ]

[22. An image capturing unit, comprising:
the compact optical system of claim 12;
a light source; and
an image sensor, wherein the image sensor is disposed on the image side of the compact optical system.]

[23. The image capturing unit of claim 22, wherein the light source is within a wavelength range of 400 nanometers (nm) to 500 nm.]

*24. A compact optical system comprising three lens elements, the three lens elements being, in order from an object side to an image side, a first lens element, a second lens element and a third lens element, and each of the three lens elements having an object-side surface facing toward the object side and an image-side surface facing toward the image side;*

*wherein the first lens element has negative refractive power, the object-side surface of the first lens element is concave in a paraxial region thereof, the object-side surface of the first lens element has at least one convex shape in an off-axis region thereof, the object-side surface of the second lens element is convex in a paraxial region thereof, and the third lens element has positive refractive power; and*

*wherein a focal length of the compact optical system is f, an entrance pupil diameter of the compact optical system is EPD, and the following condition is satisfied: f/EPD<2.60.*

*25. The compact optical system of claim 24, wherein the second lens element has positive refractive power, the image-side surface of the second lens element is convex in a paraxial region thereof.*

*26. The compact optical system of claim 24, wherein the image-side surface of the third lens element is convex in a paraxial region thereof.*

*27. The compact optical system of claim 24, wherein the image-side surface of the first lens element is concave in a paraxial region thereof, and an axial distance between the first lens element and the second lens element is larger than an axial distance between the second lens element and the third lens element.*

*28. The compact optical system of claim 24, wherein a refractive index of the first lens element is N1, a refractive index of the second lens element is N2, a refractive index of the third lens element is N3, and the following condition is satisfied:*

*4.70<N1+N2+N3<5.50.*

*29. The compact optical system of claim 24, wherein an axial distance between the first lens element and the second lens element is T12, a central thickness of the first lens element is CT1, and the following condition is satisfied:*

*1.50<T12/CT1<10.*

*30. The compact optical system of claim 24, wherein at least one of the object-side surface and the image-side surface of the third lens element has at least one inflection point, a curvature radius of the object-side surface of the third lens element is R5, a curvature radius of the image-side surface of the third lens element is R6, and the following condition is satisfied:*

*(R5+R6)/(R5−R6)<0.90.*

*31. The compact optical system of claim 24, wherein a curvature radius of the object-side surface of the third lens element is R5, a curvature radius of the image-side surface of the third lens element is R6, and the following condition is satisfied:*

*−0.50<(R5+R6)/(R5−R6)<0.50.*

*32. The compact optical system of claim 24, wherein an axial distance between an imaged object and an image surface is OTL, and the following condition is satisfied:*

*OTL<5.0 millimeters (mm).*

*33. The compact optical system of claim 24, further comprising a flat panel located between an imaged object and the object-side surface of the first lens element, wherein a central thickness of the flat panel is CTf, a central thickness of the first lens element is CT1, and the following condition is satisfied:*

*0.95<CTf/CT1<5.5.*

*34. An image capturing unit, comprising:*
*the compact optical system of claim 24;*
*a barrel member; and*
*an image sensor, disposed on the image side of the compact optical system.*

35. An electronic device comprising:

a biometric system, wherein the biometric system comprises the image capturing unit of claim 34.

36. A compact optical system comprising three lens elements, the three lens elements being, in order from an object side to an image side, a first lens element, a second lens element and a third lens element, and each of the three lens elements having an object-side surface facing toward the object side and an image-side surface facing toward the image side;

wherein the first lens element has negative refractive power, the object-side surface of the first lens element is concave in a paraxial region thereof, the object-side surface of the first lens element has at least one convex shape in an off-axis region thereof, and the object-side surface of the second lens element is convex in a paraxial region thereof; and wherein a focal length of the compact optical system is f, an entrance pupil diameter of the compact optical system is EPD, an axial distance between an imaged object and an image surface is OTL, a maximum image height of the compact optical system is ImgH, and the following conditions are satisfied:

$$f/EPD<2.60;$$

$$f/ImgH<0.70; \text{ and}$$

$$OTL/ImgH<12.$$

37. The compact optical system of claim 36, wherein at least one of the object-side surface and the image-side surface of the first lens element is aspheric, at least one of the object-side surface and the image-side surface of the second lens element is aspheric, at least one of the object-side surface and the image-side surface of the third lens element is aspheric, each of the first lens element, the second lens element and the third lens element is made of plastic material, the first lens element, the second lens element and the third lens element are all stationary relative to one another in a paraxial region thereof.

38. The compact optical system of claim 36, wherein the focal length of the compact optical system is f, the entrance pupil diameter of the compact optical system is EPD, and the following condition is satisfied:

$$f/EPD\leq 1.60.$$

39. The compact optical system of claim 36, wherein an axial distance between the imaged object and the object-side surface of the first lens element is OL, an axial distance between the object-side surface of the first lens element and the image surface is TL, and the following condition is satisfied:

$$0<OL/TL<1.0.$$

40. The compact optical system of claim 36, wherein the axial distance between the imaged object and the image surface is OTL, and the following condition is satisfied:

$$OTL<8.0 \text{ mm}.$$

41. The compact optical system of claim 36, further comprising an aperture stop located between the first lens element and the second lens element, wherein an axial distance between the aperture stop and the object-side surface of the second lens element is Dsr3, an axial distance between the aperture stop and the object-side surface of the third lens element is Dsr5, and the following condition is satisfied:

$$0<|Dsr3/Dsr5|<0.50.$$

42. An image capturing unit, comprising:

the compact optical system of claim 36;

a light source; and an image sensor, wherein the image sensor is disposed on the image side of the compact optical system.

43. The image capturing unit of claim 42, wherein the light source is within a wavelength range of 400 nanometers (nm) to 500 nm.

44. A compact optical system comprising three lens elements, the three lens elements being, in order from an object side to an image side, a first lens element, a second lens element and a third lens element, and each of the three lens elements having an object-side surface facing toward the object side and an image-side surface facing toward the image side;

wherein the first lens element has negative refractive power, the object-side surface of the first lens element is concave in a paraxial region thereof, the object-side surface of the first lens element has at least one convex shape in an off-axis region thereof, the third lens element has positive refractive power, the object-side surface of the third lens element is convex in a paraxial region thereof, and the image-side surface of the third lens element is concave in a paraxial region thereof; and wherein a focal length of the compact optical system is f, an entrance pupil diameter of the compact optical system is EPD, and the following condition is satisfied:

$$f/EPD<2.60.$$

45. The compact optical system of claim 44, wherein the second lens element has positive refractive power, the image-side surface of the first lens element is concave in a paraxial region thereof.

46. The compact optical system of claim 44, wherein an axial distance between an imaged object and an image surface is OTL, a sum of central thicknesses of the first lens element, the second lens element and the third lens element is $\Sigma CT$, and the following condition is satisfied:

$$OTL/\Sigma CT<4.0.$$

47. The compact optical system of claim 44, further comprising an aperture stop located between the first lens element and the second lens element, wherein an axial distance between the aperture stop and the object-side surface of the second lens element is Dsr3, an axial distance between the aperture stop and the object-side surface of the third lens element is Dsr5, and the following condition is satisfied:

$$0<|Dsr3/Dsr5|<0.50.$$

48. The compact optical system of claim 44, further comprising a flat panel located between an imaged object and the object-side surface of the first lens element, wherein an axial distance between the first lens element and the second lens element is larger than an axial distance between the second lens element and the third lens element.

* * * * *